US008159535B2

(12) United States Patent
Kitani et al.

(10) Patent No.: US 8,159,535 B2
(45) Date of Patent: Apr. 17, 2012

(54) COMMUNICATION SYSTEM, COMMUNICATION TERMINAL AND INFORMATION PROCESSING DEVICE

(75) Inventors: Mitsuhiro Kitani, Yokohama (JP); Hidenori Sakaniwa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1390 days.

(21) Appl. No.: 11/790,884

(22) Filed: Apr. 27, 2007

(65) Prior Publication Data

US 2007/0285512 A1 Dec. 13, 2007

(30) Foreign Application Priority Data

Jun. 7, 2006 (JP) ................................. 2006-157983

(51) Int. Cl.
*H04N 7/18* (2006.01)
*G01M 17/00* (2006.01)
*G06F 19/00* (2011.01)
*G08G 1/123* (2006.01)

(52) U.S. Cl. .......... 348/148; 348/149; 701/35; 701/117; 340/995.13

(58) Field of Classification Search .......... 348/148–149; 701/35, 117; 340/995.13
See application file for complete search history.

(56) References Cited

U.S. PATENT DOCUMENTS

| 6,178,374 | B1 * | 1/2001 | Mohlenkamp et al. | 701/117 |
| 6,263,276 | B1 * | 7/2001 | Yokoyama et al. | 701/207 |
| 6,564,127 | B1 * | 5/2003 | Bauerle et al. | 701/33 |
| 7,343,242 | B2 * | 3/2008 | Breitenberger et al. | 701/117 |
| 7,711,355 | B1 * | 5/2010 | Kruger et al. | 455/417 |
| 2002/0041240 | A1 * | 4/2002 | Ikeda et al. | 340/993 |
| 2002/0063637 | A1 * | 5/2002 | Eida et al. | 340/901 |
| 2002/0115423 | A1 * | 8/2002 | Hatae et al. | 455/404 |
| 2002/0173907 | A1 * | 11/2002 | Ando | 701/209 |
| 2003/0112133 | A1 * | 6/2003 | Webb et al. | 340/436 |
| 2003/0210806 | A1 * | 11/2003 | Yoichi et al. | 382/104 |
| 2003/0212567 | A1 * | 11/2003 | Shintani et al. | 705/1 |
| 2004/0106372 | A1 * | 6/2004 | Andersson et al. | 455/3.02 |
| 2004/0252192 | A1 * | 12/2004 | Adachi et al. | 348/148 |
| 2006/0092043 | A1 * | 5/2006 | Lagassey | 340/907 |

(Continued)

FOREIGN PATENT DOCUMENTS

JP 10-239075 A 9/1998

(Continued)

OTHER PUBLICATIONS

Japanese Office Action issued in Japanese Patent Application No. JP 2006-157983 dated Aug. 24, 2010.

*Primary Examiner* — Abdullah Salad
*Assistant Examiner* — Wing Ma
(74) *Attorney, Agent, or Firm* — McDermott Will & Emery LLP

(57) ABSTRACT

A communication system has a communication terminal and information processing device that can be mounted on a movable body. The information processing device includes a request transmission part that transmits to a communication terminal within a predetermined range a request signal, the request signal requesting the transmission of an image, through broadcast communication for transmitting information to a plurality of transmitting partners. The request signal contains a positional information indicative of a position. The communication terminal includes: an image shooting part that shoots an image around the communication terminal; a position acquisition part that obtains a position at which the image is shot; a recording part that associates and records the shot image and the position; and a receiving part that receives the request signal; and an image transmission part that transmits an image.

24 Claims, 7 Drawing Sheets

U.S. PATENT DOCUMENTS

| | | | |
|---|---|---|---|
| 2008/0204191 A1* | 8/2008 | Alrabady | 340/5.21 |
| 2009/0015684 A1 | 1/2009 | Ooga et al. | |
| 2010/0100276 A1* | 4/2010 | Fujinawa et al. | 701/33 |

FOREIGN PATENT DOCUMENTS

| | | |
|---|---|---|
| JP | 2000-293777 A | 10/2000 |
| JP | 2001-202577 | 7/2001 |
| JP | 2003-050131 A | 2/2003 |
| JP | 2003-317193 A | 11/2003 |
| JP | 2004-038866 | 2/2004 |
| JP | 2004-062641 A | 2/2004 |
| JP | 2005-064784 | 3/2005 |
| JP | 2005-078302 | 3/2005 |
| JP | 2005-267594 | 9/2005 |
| WO | WO 2007/080921 A1 | 7/2007 |

* cited by examiner

| MEMORY ADDRESS 300 | SHOT IMAGE DATA 301 | TIME INFORMATION 302 | POSITIONAL INFORMATION 303 | | |
|---|---|---|---|---|---|
| | | | LATITUDE | LONGITUDE | ALTITUDE |
| FFFFA0H | FRAME 0 | 11:11:11.111 | NORTH LATITUDE 11°11'11" 1111 | EAST LONGITUDE 111°11'11" 1111 | 500m |
| FFFFB1H | FRAME 1 | 11:11:12.111 | NORTH LATITUDE 12°11'11" 1111 | EAST LONGITUDE 112°11'11" 1111 | 505m |
| FFFFC2H | FRAME 2 | 11:11:13.111 | NORTH LATITUDE 13°11'11" 1111 | EAST LONGITUDE 113°11'11" 1111 | 510m |

⋮

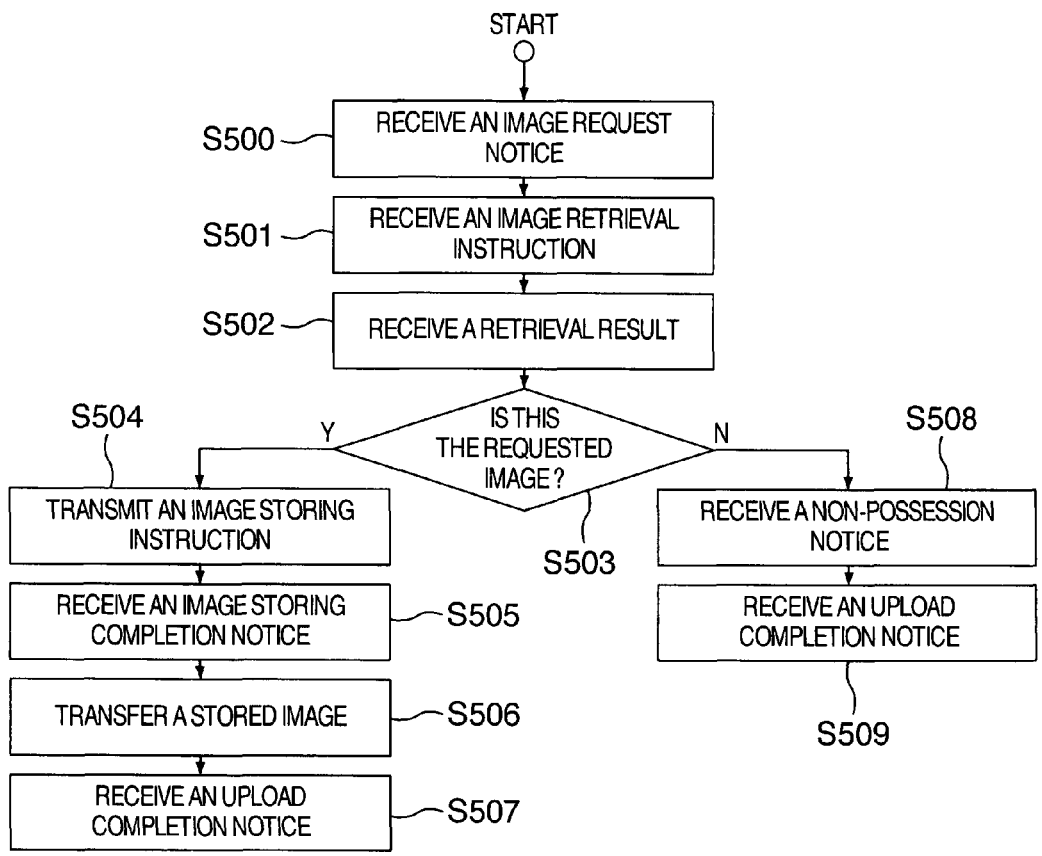

COMMUNICATION SYSTEM, COMMUNICATION TERMINAL AND INFORMATION PROCESSING DEVICE

INCORPORATION BY REFERENCE

This application claims the benefit of priority of Japanese Application No. 2006-157983 filed on Jun. 7, 2006, the disclosure of which also is entirely incorporated herein by reference.

BACKGROUND

The present invention relates to communication systems, communication terminals, and information processing devices.

In the case where a traffic accident occurred, the explanation of circumstances of the accident may differ between the parties.

JP-A-2004-38866 describes an image information providing system including: an information providing vehicle, the user of which is registered as a member and which provides information using an imaging unit, a positional information acquisition unit, a car navigation system with a large capacity storage device, and a mobile telephone device with an information communication function; an ASP (Application Service Provider) center that retrieves an information providing vehicle from a positional information, the information providing vehicle being closely matching with the image information on a required location, and issues an information gathering request to the information providing vehicle; and a user device registered as a member, to which a delivery request of the image information on the required location is made through a networking process and by means of which the image information on the required location is directly provided from the information providing vehicle in response to the information gathering request from the ASP center.

SUMMARY

In the image information providing system described in JP-A-2004-38866, the image providing vehicle transmits a positional information, a time information, and an image information to the ASP center at predetermined intervals. However, if an image is transmitted from plenty of vehicles at the predetermined intervals, the load on the communication infrastructure may increase or the image unnecessary for the ASP center may increase. Moreover, if the interval for transmitting information is long, the ASP center might not recognize the whole driving route of the information providing vehicle and thus might not identify which vehicle is running near the accident site.

Then, the present invention is intended to provide a communication system capable of suitably providing an image, and a communication terminal and an information processing device that can be used in the communication system.

The communication system according to an embodiment of the present invention includes a communication terminal that can be mounted on a movable body and an information processing device. The information processing device includes a request transmission part that transmits to a communication terminal within a predetermined range a request signal, the request signal requesting the transmission of an image, through broadcast/multicast communications for transmitting information to a plurality of transmitting partners. The request signal contains a positional information indicative of a position. The communication terminal includes: an image shooting part that shoots an image around the communication terminal; a position acquisition part that obtains a position at which the image is shot; a recording part that associates and records the shot image and the position; and a receiving part that receives a request signal; an image transmission part that transmits an image. The image transmission part transmits an image to the information processing device when the recording part has the image recorded therein, the image corresponding to a position which a positional information contained in the received request signal indicates.

Other objects, features and advantages of the invention will become apparent from the following description of the embodiments of the invention taken in conjunction with the accompanying drawings.

BRIEF DESCRIPTION OF THE DRAWINGS

FIG. 5 is a view showing an operation example of an image storing/transferring control part in the first embodiment.

FIG. 6 is a view showing an example of the format of an image request notice to a vehicle from the information management center in the first embodiment.

DETAILED DESCRIPTION

Hereinafter, as an example of a communication system, an accident image transmitting/receiving system is described in which at the time of a traffic accident an image around the accident site is shot with a communication terminal mounted on a movable body and is transmitted to the center.

Figure 1:
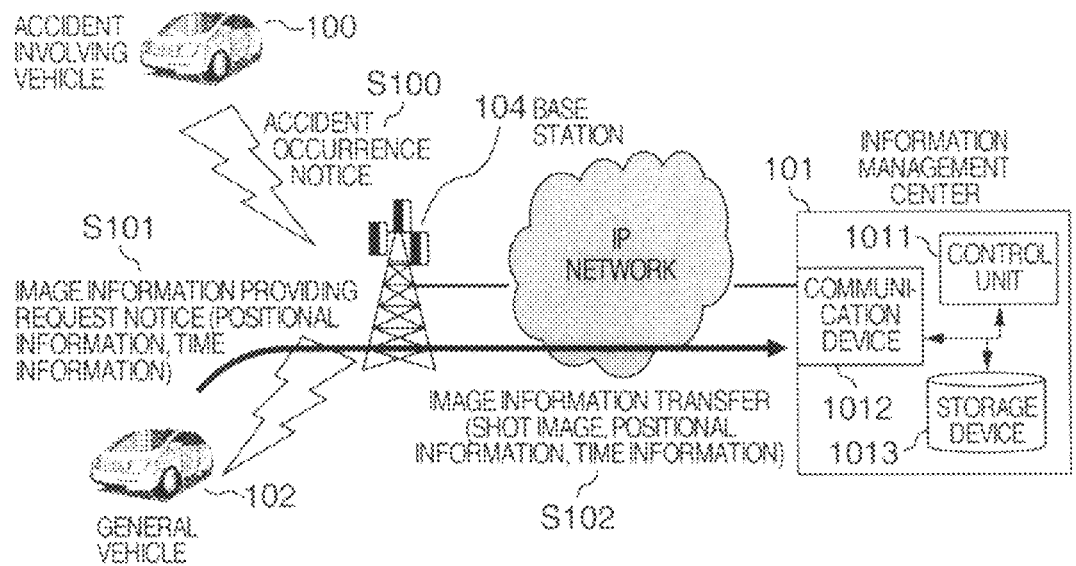
FIG. 1 is a view showing the overview of a vehicle image communication system.

FIG. 1 is a view showing the overview of the accident image transmitting/receiving system. In addition, FIG. 1 shows a vehicle as an example of the movable body, but not limited thereto. In the following descriptions, the "movable body" refers to a movable object, such as a people, an animal, or a car. Although "mounting" means attaching to a movable body, or wearing, it also includes the case of keeping in a bag or a pocket and the case of simply holding if the movable body is a people. Moreover, if the movable body is a vehicle or the like, it also includes the case of incorporating as a part of the vehicle or the like.

An accident involving vehicle 100 and a general vehicle 102 are the vehicles having a communication terminal mounted therein. First, when an accident occurred, the accident involving vehicle 100 that encountered the accident transmits to an information management center 101 that manages accidents an accident occurrence notice indicative of the occurrence of the accident with the use of the mounted communication terminal (S100). The information management center 101 is, for example, a server, a host, or the like which a vehicle insurance company and the police utilize. The information management center 101 includes, for example, a control unit 1011 that controls each configuration, a communication device 1012 that carries out communication through an IP network or the like, or a public network, and a storage device 1013 such as a database for storing images. The informing process to inform in S100 may the one using any of a fixed-line telephone network, a portable telephone network, and an IP network. Here, in order to clarify the time and location of the occurrence of an accident, the accident occurrence notice contains the time information and positional information at the time of the accident. As an alternative technique of identifying the time and location of the occurrence of an accident, the information management center 101 may compute the time information and positional information at the time of the accident by monitoring a camera installed at an intersection or the like and detecting the occurrence of the accident.

Then, the information management center 101 that received the accident occurrence notice transmits to the general vehicle 102 an accident information providing request (S101). The general vehicle 102 refers to a group of vehicles running on a driveway or stopping on a driveway, the vehicles not having encountered the accident. The image information providing request contains the time information and positional information at the time of the accident and requests for images near the accident site which the general vehicle 102 shot.

Then, if the general vehicle 102 possesses the accident information requested from the information management center 101, it transfers the accident information to the information management center 101 (S102). Here, the accident information refers to an information associating the shot image with the shot time information and positional information.

By introducing such system, the information management center 101 can collect useful information on the accident also from other than the accident involving vehicle 100, thereby allowing the accident processing to be speeded up.

A base station 104 is the base station that mediates the exchange of information between the general vehicle 102 or the like and the information management center 101. The base station 104 is a base station in a mobile communication network, for example. Moreover, the base station 104 may be, for example, a broadcast base station or the like for data broadcasting.

In this system, in order to secure the credibility of information, the authentication process (or authentication authorization accounting) of a vehicle or a driver might be introduced in the information management center 101 when exchanging information in S100, S101, and S102. The authentication process includes, for example, the user authentication, vehicle authentication, and furthermore the authentication whether or not the user takes this service, and the like.

A first embodiment will be described using FIGS. 2-6.

Figure 2:
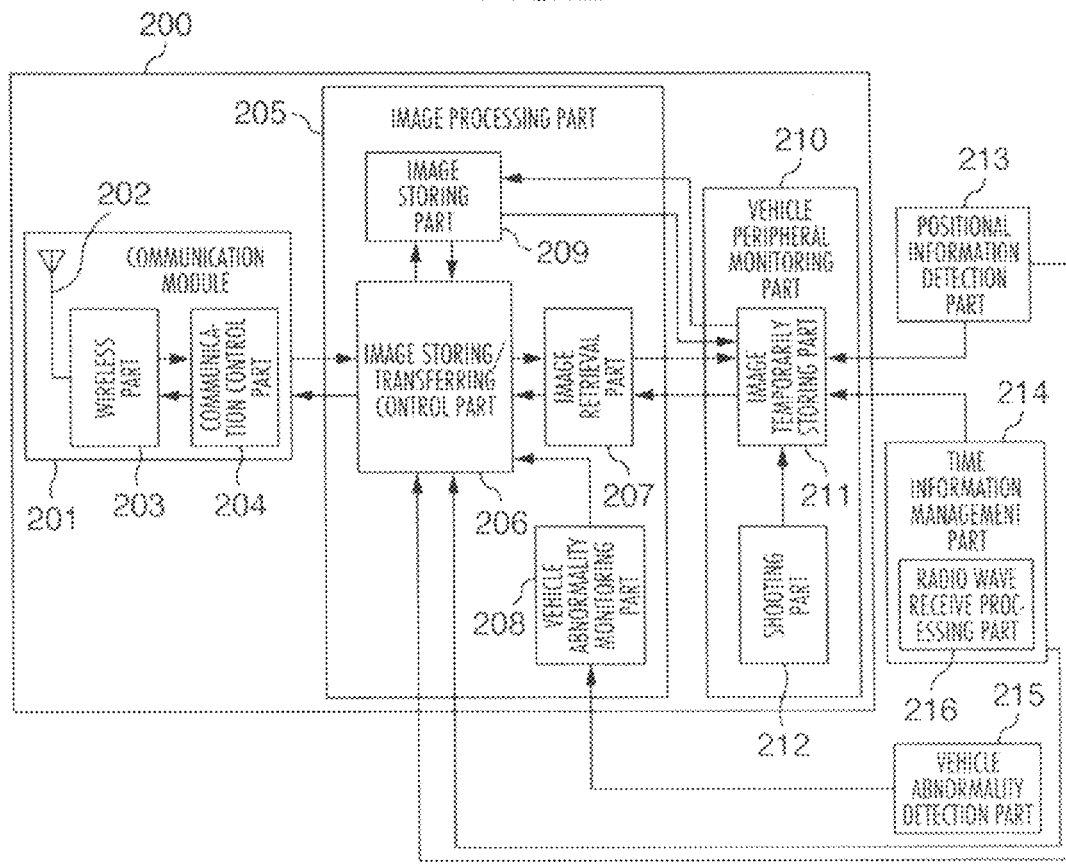
FIG. 2 is a view showing a configuration example of a vehicle information storage device with a communication module in a first embodiment.

FIG. 2 is a view showing the configuration of a vehicle information storage device that is an example of the communication terminal. A vehicle information storage device 200 is a device that can be mounted on a movable body, and includes a communication module 201, an image processing part 205, and a vehicle peripheral monitoring part 210.

The communication module 201 is a communication device for exchanging the time information, positional information, and image information described later with the information management center 101 that is an organization managing the accident, and includes an antenna 202, a wireless part 203, and a communication control part 204. The image processing part 205 is a processing unit that carries out processings in general related to the image information, and includes an image storing/transferring control part 206, an image retrieval part 207, a vehicle abnormality monitoring part 208, and an image storing part 209. The vehicle peripheral monitoring part 210 is a device that shoots an image around the vehicle from a shooting part installed in the vehicle and temporarily records this image, and includes an image temporarily recording part 211 and a shooting part 212. Moreover, the vehicle information storage device 200 receives, as needed, the information that is managed by a positional information detection part 213 that detects the positional information on its own vehicle as required, a time information management part 214 that manages time, and a vehicle abnormality detection part 215 that detects an abnormality of its own vehicle.

The antenna 202 in the communication module 201 is a transmission/reception antenna used for communication. The wireless part 203 includes a modulation/demodulation circuitry required for utilizing a communication system, such as TDMA, CDMA, and wireless LAN, and a modulation/demodulation circuitry required in receiving an information transmitted by a land-based digital broadcasting, BCMCS (Broadcast Multicast Service), or the like. Moreover, the wireless part 203 has various kinds of communication protocols implemented therein. Moreover, the wireless part 203 may accommodate a single communication system or may accommodate a plurality of communication systems. The communication control part 204 is a device that controls and manages communication and controls the transmission/reception of data exchanged between the communication module 201 and the image processing part 205. The communication control part 204 includes an information processing device, such as CPU, MPU, or DSP.

The image processing part 205 is an image processing unit that retrieves a desired image out of the images around the vehicle, the images being shot by the shooting part 212 installed in the vehicle, stores the image that causes difficulties if it is overwrite-recorded by a newly shot image, and controls the timing of transferring the stored image to the communication control part 204. When uploading an image stored in the image storing part 209 via the communication module 201 to the information management center 101, the image storing/transferring control part 206 controls the timing of uploading. Moreover, upon receipt of a notice indicative of a vehicle being in an abnormal condition from the vehicle abnormality monitoring part 208, the image storing/transferring control part 206 transmits to the image storing part 209 an execution instruction for starting to store the image. Moreover, upon receipt of an image information providing request notice from the information management center 101, the image storing/transferring control part 206 transmits to the image retrieval part 207 a retrieval instruction for retrieving whether or not the accident information is held within the image information that is temporarily recorded in the image temporarily recording part 211. Moreover, upon receipt of a detection notice of abnormality (hereinafter, refers to as a vehicle abnormality detection notice) from the vehicle abnormality monitoring part 208, the image storing/ transferring control part 206 associates the vehicle abnormality detection notice, the positional information on its own vehicle obtained from the positional information detection part 213, and a standard time information obtained from the time information management part 214, and transmits these to the communication control part 204. The image storing/transferring control part 206 includes a control unit, such as CPU or MPU, for example. Upon receipt of an image retrieval request from the information management center 101 via the communication module 201, the image retrieval part 207 retrieves a requested image out of the image information that is temporarily recorded in the image temporarily recording part 211, and determines whether or not there is any coinciding image. The vehicle abnormality monitoring part 208 monitors the vehicle abnormality detection part 215 installed in the vehicle and checks whether or not there is any vehicle abnormality. When the vehicle abnormality monitoring part 208 detected a vehicle abnormality, it will inform this to the image storing/transferring control part 206. The vehicle abnormality detection part 215 includes sensors, such as an acceleration sensor and an impact sensor, capable of detecting a vehicle abnormality, and detects the encounter with an accident or a vehicle failure. The image storing part 209 is a storage device that copies the image information from the recording part 211 and stores this. The image storing part 209 includes recording devices, such as a hard disk and memory.

The image temporary recording part 211 includes recording devices, such as a hard disk and memory. The image information that is temporarily recorded in the image temporarily recording part 211 is overwrite-recorded and erased by a newly shot image after a certain period of time. Accordingly, in order not to cause difficulties even if the image information is erased, the image information that is already recorded in the image temporarily recording part 211 is copied to the image storing part 209 to store. The image temporary recording part 211 is a recording device that temporarily records an information (hereinafter, referred to as image information) made by mapping the image information around the vehicle shot by the shooting part 212, a positional information on its own vehicle detected by the positional information detection part 213, and a time information that is managed by the time information management part 214. The time information management part 214 manages accurate time information available by a radio wave receiving/processing part 216 periodically receiving the radio wave.

Figures 3, 4:
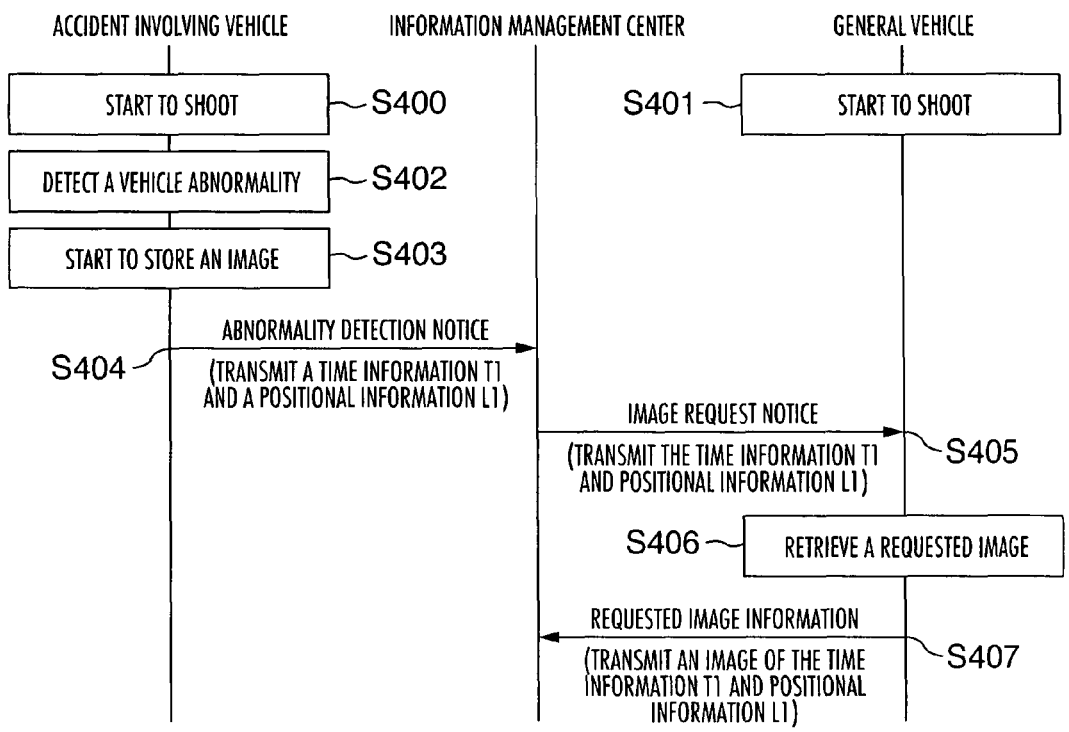
FIG. 3 is a view showing an example of the format of image information at the time of recording an image in an image temporarily recording part in the first and second embodiments.
FIG. 4 is a view showing an operation example of a vehicle and an information management center at the time of an accident in the first embodiment.

The mapped image information is temporarily recorded in the image temporarily recording part 211 in a format shown in FIG. 3, for example. The format from reference numerals 300 to 303 shown in FIG. 3 is just an example, and at least three informations of the time information, positional information on the vehicle, and image information just needs to be associated and recorded. Here, other than the time information and positional information, a driving route information on its own vehicle may be mapped. The above-described driving route information refers to a collection of information that is made by recording the positional information on the vehicle onto the recording area of a non-volatile memory or the like in chronological order, the positional information on the vehicle being managed by the positional information detection part 213. By mapping the driving route information this way, it is possible to identify a more detailed vehicle position, such as to detect a back road, which might not be identified only with the positional information. Moreover, the positional information detection part 213 includes a position acquisition device using a technique of computing the position of its own vehicle, such as a GPS method, for example. Moreover, the positional information detection part 213 may employ a self-contained navigation system combining a gyroscope method and a GPS method together. Use of these systems allows a more accurate vehicle position to be computed. The shooting part 212 is a device that shoots the image around the vehicle, and includes, for example, a camera and the like.

FIG. 4 is a sequence diagram at the time of an accident showing the respective operations of the accident involving vehicle 100, the information management center 101 that is an organization for managing the accident, and the general vehicle 102 not having involved in the accident. Hereinafter, with reference to FIG. 4 the respective communications of the accident involving vehicle 100, the information management center 101, and the general vehicle 102 are described. In addition, assume that the both accident involving vehicle 100 and general vehicle 102 are equipped with the vehicle information storage device of FIG. 2.

First, in S400 and S401, the accident involving vehicle 100 and the general vehicle 102 start to shoot an image around the vehicle by using the shooting part 212, respectively. In S400 and S401, the timing for the shooting part 212 to start shooting may be when the engine of the vehicle is started, or may be at any timing which the driver selects.

Then, in S402, upon detection of a vehicle abnormality by the vehicle abnormality detection part 215, the accident involving vehicle 100 transmits a vehicle abnormality notice to the image storing/transferring control part 206. Then, in S403, the image storing/transferring control part 206 transmits to the image storing part 209 an instruction for starting to store the image, and the image storing part 209 starts to store the image that is temporarily recorded in the image temporarily recording part 211. The vehicle abnormality detection part 215 includes devices, such as an acceleration sensor and an impact sensor, capable of detecting the vehicle abnormality, and upon detection of a vehicle abnormality, such as an abrupt change in the vehicle speed and a shock equal to or more than a certain level, it will inform the vehicle abnormality monitoring part 208 of the fact that the vehicle abnormality occurred. Moreover, as the technique of detecting a vehicle abnormality, a flag indicating, for example, whether the vehicle condition is normal or abnormal might be used. The vehicle abnormality detection part 215 will not set the flag if the vehicle is in the normal condition and will set the flag if an abnormality is detected. The vehicle abnormality monitoring part 208 can detect whether the vehicle condition is normal or abnormal by monitoring the flag of the vehicle abnormality detection part 215. Here, as the technique of detecting a vehicle abnormality other than an acceleration sensor, a mechanism that is coupled with an air bag and detects a vehicle abnormality at the time of the operation of the air bag may be employed. Moreover, provision may be made such that a plurality of various sensors (N sensors) are used and if n sensors or more (with an arbitrary threshold) detected an abnormality, it is determined that a vehicle abnormality is occurring. In this way, it is possible to decrease the probability of causing an erroneous abnormality detection as compared with the case of detecting an abnormality using one sensor.

As the technique of storing image information in S403, the image information may be copied to the image storing part 209 from the image temporarily recording part 211, or the image storing part 209 may manage the address for recording shot images by distinguishing between an overwrite-recordable area and other area of the image temporarily recording part 211 with the use of an address information. Moreover, the image storing/transferring control part 206 may control the image of the accident site so as to prohibit overwriting until the image is transmitted to the control center 101. This allows the information storing device 200 to continue to record the image while the image of the accident site remains stored. Moreover, for the time to start storing the image, the recorded image from a time point T-t, which is t (sec) before a time T when a vehicle abnormality notice is received, may be stored. The larger this t is the more detailed accident verification can be carried out because the situation before the accident can be verified later.

Then, in S404, the accident involving vehicle 100 that detected the vehicle abnormality transmits an abnormality detection notice to the information management center 101 via the communication module 201. At this time, informations to be added to the abnormality detection notice are a time information T1 and a positional information L1. T1 is the information used for determining the time of the occurrence of the accident, and L1 for determining the location of the occurrence of the accident. Determining the location of the accident site in S404 may be carried out by the information management center 101 as described in S100 of FIG. 1 without using the positional information L1 of the vehicle. In this case, the abnormality detection notice which the accident involving vehicle 100 transmits in S404 is only the time information T1. Moreover, the abnormality detection notice may contain sensor values of an acceleration sensor and the like. This allows the information management center 101 to obtain more detailed situation.

Moreover, also with regard to the determination of the time of the occurrence of the accident in S404, the information management center 101 may carry out this without using the time information T1. In this case, the information which the accident involving vehicle 100 transmits in S404 is only the abnormality detection notice.

In S405, the information management center 101 that received the abnormality detection notice from the accident involving vehicle 100 transmits to the general vehicle 102 a request notice (image request notice) of the image shot in the vicinity of L1 at the time T1. In this case, the information to use in the abnormality detection notice is the time information T1 and positional information L1 received from the accident involving vehicle 100.

The communication process of issuing the image request notice in S405 includes a broadcasting process of broadcasting to a predetermined range, for example. Here, the broadcasting refers to simultaneously transmitting a specific information to a plurality of transmitting partners. The information management center 101 transmits the image request notice using the broadcasting process. Accordingly, even if there are plenty of general vehicles 102 around the accident site, it is not necessary to identify a certain general vehicle. By limiting the range, to which the image request notice is transmitted, to around the accident site and transmitting the image request notice, it is not necessary for the information management center 101 to recognize which vehicle exists around the accident site. It is also possible to exclude a wasteful notice directed to vehicles existing in locations far away from the accident site.

The example of this broadcasting process includes data broadcasting by means of VICS (registered trademark), multicast communication, and land-based digital broadcasting. Among these, VICS (Vehicle Information and Communication System) is a system using media, such as a radio beacon, an optical beacon, or FM multiplex broadcast. The use of VICS allows the image request notice to be transmitted to vehicles under various conditions, the vehicles having been near the accident site, such as vehicles running on a highway, vehicles running on an ordinary road, and furthermore vehicles capable of receiving the radio wave of FM multiplex broadcasting. In addition, the beacon refers to a device that transmits and receives the position coordinate of the vehicle, road traffic information, and the like, the device being installed on a roadside and including a communication device.

Moreover, if the image request notice is distributed using a multicast distribution from a base station as the broadcasting process, it is possible to inform only vehicles in the areas which one or more specific base stations cover. Accordingly, it is possible to exclude a wasteful notice directed to vehicles existing in locations far away from the accident site.

Moreover, even if the image request notice is distributed through data broadcasting, such as land-based digital broadcasting, as the broadcasting process, the data broadcasting can be carried out limiting the area, so it is possible to inform only vehicles near the accident site.

Moreover, by means of these broadcasting processes, it is also possible to carry out a push type information distribution. Accordingly, even if the information management center 101 did not recognize the position of the general vehicle 102 existing near the accident site before the occurrence of the accident, it is possible to transmit an image providing request if the general vehicle 102 exists near the accident site. Of course, unicast communication may be employed as the image request communication process.

On the other hand, in S404, the information management center 101 may examine the truth of the notice concerning the abnormality detection notice from the accident involving vehicle 100. The method of ascertaining the truth might include checking the situation with the driver by using voice communication or data communication, or asking a person concerned or a resident being near the accident location to go to the accident site and thereby recognizing the situation. This allows to address to an erroneous abnormality detection notice due to the malfunction or the like of a system that automatically informs, the system being installed in the vehicle.

Moreover, in S402, if two or more vehicles (n vehicles) encountered with an accident such as a chain-reaction accident and the n vehicles simultaneously informed the information management center 101 of the vehicle abnormality detection at the same time instance, the same image request notice with regards to the location (positional information L1) at which the accident occurred will be transmitted to the general vehicle 102 n times. Then, in order to prevent the duplicating image request notices described above, the information management center 101 waits for T3 (sec) after receiving an abnormality detection notice in S404 until it sends an image request notice in S405, and thereby it is possible to put a plurality of image request notices from the same location into one image request notice and to inform this. However, even if the above-described idea is introduced, it is assumed that the general vehicle 102 receives an image request notice with regard to the same location, e.g., L1 location, multiple times. In the case where the same image request notice as the image request notice received once is received again like in this case, provision may be made such that the general vehicle 102 will not respond. At this time, the transmission of a notice indicative of having already received the image request notice might clarify that there is no intention to transmit the image. This allows to avoid retrieving the image multiple times or avoid uploading the image multiple times with regards to the same image request notice at the accident site, thus helping to suppress the wasteful processing of the information storing device and the communication fee and communication traffic occurring in carrying out the communication.

Subsequently, in S406, the general vehicle 102 that received the image request notice carries out in the image retrieval part 207 the requested image retrieval of whether or not the image temporarily recording part 211 possess the image which the information management center 101 is requesting. In addition, the retrieval of whether possessing the requested image or not is carried out by using two informations of time information T1 and positional information L1, not by using the image information.

In S406, as a result of the retrieval by the image retrieval part 207, if it is determined that the image temporarily recording part 211 possesses the requested image, the image information (requested image information) containing the time T1 and positional information L1 is uploaded to the information management center 101 in S407. In S407, in order not cause difficulties even if the image information to be uploaded is overwrite-recorded by a newly shot image, the image storing/transferring control part 206 may transmit to the image storing part 209 an instruction for starting to store the image, and the image storing part 209 may start to store the image that is temporarily recorded in the image temporarily recording part 211. The technique of storing image information is as described in S403.

In order for the accident involving vehicle 100, the information management center 101, and the general vehicle 102 in FIG. 4 to carry out the communications based on the time information (T1), the time informations managed by the accident involving vehicle 100, the information management center 101, and the general vehicle 102 are assumed to be in synchronization to each other. Then, in order to take synchronization of time, it is necessary to periodically receive a radio wave by the radio wave receiving/processing part 216 to obtain accurate time. The radio wave refers to the long wavelength standard wave JJY, and Japan Standard Time is obtained by receiving this. Moreover, the synchronization of time might be taken by using GPS other than the radio wave. In this way, the image information can be retrieved with reference to the synchronized time, and it is therefore possible to suppress the inefficient operation of exchanging the image of the time which the information management center 101 is not requesting, as much as possible.

Moreover, considering the case where the times managed by the accident involving vehicle 100, the information management center 101, and the general vehicle 102 are not completely in synchronization to each other, in S405 the information management center 101 might give a margin of t' before and after the time information T1 received from the accident involving vehicle 100, and issue to the general vehicle 102 a request for the images from T1−t' to T1+t'. In this way, it is possible to suppress the inefficient operation of exchanging the images which the information management center 101 is not requesting, as much as possible. On the other hand, the general vehicle 102 may give a margin of t" before and after the time information T1 received from the accident involving vehicle 100, and retrieve the images from the image temporarily recording part 211, the images being shot from T1−t" to T1+t". This allows to obtain the same advantage as the case where the information management center 101 gives the margin of t'.

Moreover, in S404 and S405, the abnormality detection notice might be directly transmitted from the accident involving vehicle 100 to the general vehicle 102 without being through the information management center 101 by using adhoc communication. The adhoc communication is made executable by the accident involving vehicle 100 and general vehicle 102 being provided with a short-distance radio communication device, such as a wireless LAN module or Bluetooth (registered trademark), that accommodates the adhoc communication mode. The use of adhoc communication allows for more prompt image request because of not being through the information management center 101. Moreover, because an image request is directly made to vehicles around the accident involving vehicle 100, this is more efficient and the probability to find a desired image is high as compared with the case where a retrieval request is informed through the information management center 101 after a certain period of time. In case of using adhoc communication and not being through the information management center 101, in order to secure the credibility of the information, an authentication processing (or authentication authorization accounting) of a vehicle or a driver between vehicle to vehicle might be introduced. The authentication processing includes, for example, the user authentication, vehicle authentication, and furthermore the authentication whether or not the user takes this service, or the like.

Moreover, in S407, for the timing of uploading the image to the information management center 101, various cases can be assumed. First, a case can be considered in which as soon as an image data corresponding to the image request notice is found, the image is uploaded. This allows to accommodate urgent situations, such as the case where the information management center 101 is urgently requesting for a retrieved image. Moreover, if the wireless part 203 shown in FIG. 2 is equipped with a plurality of modulation/demodulation circuits and communications protocols, such as CDMA and wireless LAN, and a user can select a plurality of communication processes, then the uploading might be carried out only if a specific communication process which a user set in advance becomes available. If a low cost communication process is used this way, the communication fee can be reduced. Moreover, the use of a communication process of a fast communication speed would allow for a high speed and efficient uploading. Moreover, a user might upload at an arbitrary timing. In this way, if a user wishes to give priority to other communication other than uploading, this communication can be carried out in preference to others.

Moreover, uploading might be carried out when a vehicle stops at an intersection, or the like. Communication when moving at a low speed this way allows to avoid the fluctuation of the radio wave and to avoid failures in uploading as much as possible. Moreover, with the use of a traffic jam forecast of VICS information or the like, uploading to the information management center 101 at a location where there are plenty of vehicles and the running speed decreases might be carried out. In this way, like when the vehicle stops at an intersection or the like, communication is carried out when moving at a low speed, thus allowing to avoid failures in uploading as much as possible. Moreover, a speedometer (not shown) for obtaining the moving velocity may be attached to the information storing device 200 to monitor a running speed S, and when the running speed S decreases below an arbitrary threshold s, the upload may be carried out.

Moreover, the receiving field intensity information which the communication control part 204 obtains from the wireless part 203 might be utilized to control the uploading timing. This suggests that the uploading is carried out if the receiving field intensity obtained from the wireless part 203 is higher than an arbitrary field intensity which a user set in advance. In this way, communication is carried out at a location of good radio wave environment, thereby allowing to avoid failures in uploading as much as possible. The field intensity information refers to, for example, RSSI, Ec/Io, and C/I that quantitatively indicates right and wrong of the radio wave environment. Such index does not necessarily need to be used as it is, and an information may be used that simplifies and expressing the receiving radio wave conditions of the communication terminal, such as the number of antenna bars and antenna pictographs. Moreover, the uploading may be carried out in response to the transmit timing which a base station or the information management center 101 indicates. This allows to prevent a plurality of vehicles from simultaneously uploading an image and thus to reduce the processing load of the base station and the congestion of communication traffic (or traffic in communication network).

Moreover, for the uploading timing, if an image upload timing 600 indicates "urgent", as soon as the coinciding image data is found the image may be uploaded, and if it indicates "optional" the image may be uploaded depending on the above-described running speed, the receiving field intensity information, the position of the vehicle, or the like. Accordingly, while the information storing device 200 can provide a real time information by immediately uploading the image in case of a serious accident, it can transmit under suitable conditions the image in case of an unimportant accident.

Moreover, when the general vehicle 102 receives an image request notice through broadcasting, shifting the upload timing can suppress the load to the communications infrastructure as compared with the case of simultaneously uploading.

Moreover, a system may be introduced in which after the transmission of the requested image information in S407, if this image information is the one which the information management center 101 requested, the information management center 101 pays a reward or the like for the provided information. The introduction of the reward system allows more information to be collected. In case of introducing this reward system, a personal information for keeping in contact with is attached to the requested image information in S407 because the information management center 101 needs to identify the person to pay. The above-described personal information might include the license plate information or the like of the vehicle.

On the other hand, in case of not introducing this reward system, in order to conceal the personal information a mechanism may be introduced in which the user's face and vehicle license plate are concealed or the like so that the individual cannot be identified in S407. The location to carry out the concealing process of the personal information may be either in the communication module 201 or in the information management center 101. Moreover, a third-party organization dealing with the personal information might be established so that the transmission of a requested image information to the information management center 101 is carried out through the third-party organization.

Moreover, by allowing only public organization, such as an insurance company or the police, to handle the image information, it is possible to reduce the risk of leak of the personal information and thus to improve the credibility of this service.

Moreover, since the image information that is shot by the shooting part 212 and is temporarily recorded in the image temporarily recording part 211 contains the information on others, such as a license plate of the peripheral vehicle, a mechanism might be employed in which a user is not allowed to see the image as an individual so that the user may not handle this.

Moreover, in S404 and S405, when the general vehicle 102 received an abnormality detection notice directly from the accident involving vehicle 100 through adhoc communication, the image storing/transferring control part 206 may transmit to the image storing part 209 an instruction for starting to store the image, and the image storing part 209 may start to store the image that is temporarily recorded in the image temporarily recording part 211. In this way, when other cars except its own vehicle caused an accident, it is possible to provide the image information related to the accident. The technique of storing image information is as described in S403.

FIG. 5 shows an operation example of the image storing/transferring control part 206 when it received an image request from the information management center 101 via the communication control part 204, and is a flowchart showing the data exchange between the communication module in the vehicle information storage device 200, the communication module that communicates with the information and management center 101, and the vehicle peripheral monitoring part that shoots an image around the vehicle and temporarily records this.

First, after the occurrence of an accident, in S500 the image storing/transferring control part 206 receives an image request notice from the communication control part 204. Two informations of accident encounter time information T1 and positional information L1 of the accident site, which the accident involving vehicle 100 informed to the information management center 101, are attached to the image request notice. The format of the image request notice might be the one as shown in FIG. 6, for example. The format of FIG. 6 is an example and at least two informations of time information and positional information just needs to be informed. Moreover, as shown in the image upload timing 600 of FIG. 6, the information management center 101 might specify the upload timing of the image. For example, if the image upload timing 600 is "urgent" the image might be transmitted as immediately as possible, and if it is "optional" the image might be transmitted at various upload timings shown in the operation of S407 in FIG. 4. Moreover, in S402, if the accident is serious, the information management center 1011 may set this image upload timing 600 to "urgent" and inform this to the general vehicle 102. The case where the accident is serious is when the information management center 101 received, for example, a plurality of abnormality detection notices indicative of within a predetermined time and within a predetermined range (e.g., within 30 seconds and within 50 m in radius, and also, for example, within 10 seconds and within 100 m in radius). The above case is also when the accident occurring location which the abnormality detection notice indicates is near a predetermined location registered in advance, e.g., when the accident occurred near a large intersection and a landmark. The information on this predetermined location may be recorded in the storage device 1013, for example.

Subsequently, in S501, the image storing/transferring control part 206 transmits to the image retrieval part 207 a retrieval instruction (image retrieval instruction) of the image which the information management center 101 is requesting. At this time, the time information T1 and positional information L1 used for the image retrieval are combined and transferred to the image retrieval part 207.

Subsequently, in S502 the image storing/transferring control part 206 receives from the image retrieval part 207 the retrieval result (search result) of the image retrieval instruction.

Subsequently, in S503, the image storing/transferring control part 206 determines whether the retrieval result received in S502 contains the image (requested image) whose transmission is requested from the information management center 101. If in S503 it is determined that the requested image is contained, the image storing/transferring control part 206 transmits to the image storing part 209 an instruction (store instruction) for storing the image information on the time T1, in S504. After completing to store at the image storing part 209, the image storing/transferring control part 206 receives from the image storing part 209 a notice (store completion notice) indicative of having completed storing, in S505. Subsequently, in order to transmit the image to the information management center 101 via the communication module 201, the image stored in the image storing part 209 is transferred to the communication control part 204, in S506. Upon completion of the transmission of the image to the information management center 101, in S507 the image storing/transferring control part 206 receives the upload completion notice indicative of the successful completion of uploading, thus terminating the sequence.

If in S507 the image storing/transferring control part 206 received from a base station via the communication module 201 an upload failure notice indicative of the failure of uploading, a retry of transmission is carried out at the timing described in S407 of FIG. 4. The transmission retry may be carried out repeatedly until the upload succeeds, and also the upload timings may be changed in the first transmission and in the transmission retry, respectively.

On the other hand, in S503, if the image storing/transferring control part 206 received a retrieval result that the request image (requested image) from the information management center 101 has not been found, a notice (non-possession notice) indicative of not possessing the requested image is transmitted to the communication control part 204 (S508). Then, in S509, the image storing/transferring control part 206 receives from the communication control part 204 a notice (upload completion notice) indicating that the uploading of the non-possession notice completed successfully, thus terminating the sequence.

Moreover, in S505, the image storing/transferring control part 206 may directly transfer the image from the image temporarily recording part 211 without storing the image. That is, the sequence will be the one without the processes of S504 and S505 in FIG. 5. This allows for a more prompt image transfer to the information management center 101 as compared with the case of storing this to the image storing part 209 once.

A second embodiment will be described using FIGS. 3, 4, 7, 8, and 9. The difference from the first embodiment is in that a recording capacity monitoring part described later is newly added. Because by adding the recording capacity monitoring part it is possible to autonomously check whether or not the information storing device of its own vehicle possesses the accident information which the information management center 101 requires, the accident information which the information management center 101 requires can be prevented from being deleted, thus allowing for more reliable accident information to be provided to the information management center 101.

Figure 7:
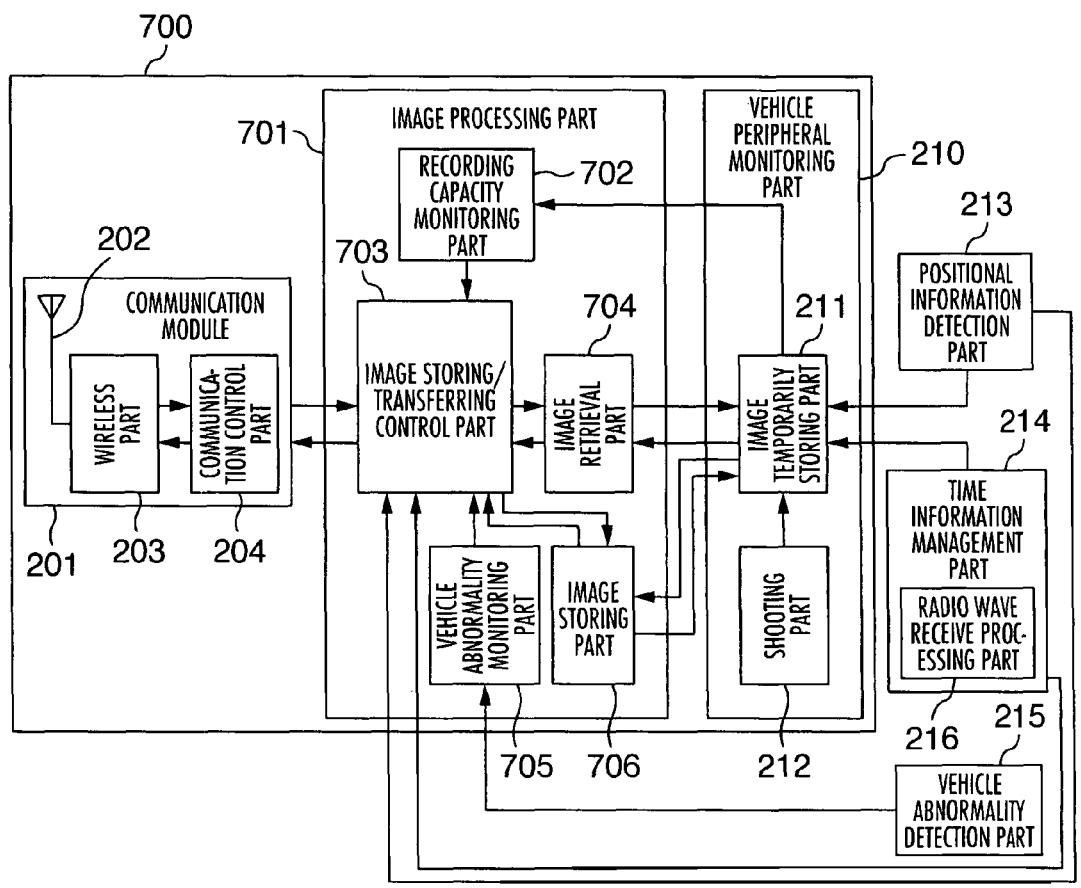
FIG. 7 is a view showing the configuration of a vehicle information storage device with a communication module in the second embodiment.

FIG. 7 is a view showing the configuration of a vehicle information storage device with the communication module, the image processing part, and the vehicle peripheral monitoring part. In addition, in FIG. 7, the same reference numerals are given to portions equivalent to those of FIG. 2.

A vehicle information storage device 700 includes the communication module 201, an image storing/transferring control part 701, and the vehicle peripheral monitoring part 210. The image processing part includes control units, such as CPU, and storage devices, such as a memory and a hard disk.

The communication module 201 is a communication module for exchanging the time information, positional information, and image information described later with the information management center 101 that is an organization for managing accidents, and includes the antenna 202, the wireless part 203, and the communication control part 204.

The image processing part 701 is an image processing unit that carries out processings in general related to the image information, and includes a recording capacity monitoring part 702, an image storing/transferring control part 703, an image retrieval part 704, a vehicle abnormality monitoring part 705, and an image storing part 706.

The vehicle peripheral monitoring part 210 is a device that shoots the image around the vehicle from the shooting part installed in the vehicle and temporarily records the image, and includes the image temporarily recording part 211 and the shooting part 212. Moreover, the vehicle information storage device 700 receives, as needed, the information managed by the positional information detection part 213 that detects the positional information on its own vehicle as needed, the time information management part 214 that manages time, and the vehicle abnormality detection part 215 that detects the abnormality of its own vehicle.

The recording capacity monitoring part 702 is a device that monitors the free space that can be temporarily recorded in the image temporarily recording part 211. The recording capacity monitoring part 702 includes control units, such as CPU, for example. When uploading the image via the communication module 201 to the information management center 101, the image being stored in the image storing part 706, the image storing/transferring control part 703 controls the timing of uploading. Moreover, the image storing/transferring control part 703 transmits a retrieval instruction for retrieving a desired image out of the images around the vehicle, the images being shot by the shooting part 212 that is installed in the vehicle. Moreover, the image storing/transferring control part 703 transmits a store instruction for storing the image that causes difficulties if it is overwrite-recorded by a newly shot image. Moreover, upon receipt of a detection notice (hereinafter, refers to as a vehicle abnormality detection notice) of vehicle abnormality from the vehicle abnormality monitoring part 705, the image storing/transferring control part 703 associates the vehicle abnormality detection notice, the positional information on its own vehicle obtained from the positional information detection part 213, and the standard time information obtained from the time information management part 214, and transmits these to the communication control part 204. The image storing/transferring control part 703 includes a control unit, such as CPU, for example.

When the image retrieval part 704 received an image retrieval request from the information management center 101 via the communication module 201, the image retrieval part 704 receives the image retrieval request from the image storing/transferring control part 703, and retrieves an image, the image being requested from the image storing/transferring control part 703, out of the image information temporarily recorded in the image temporarily recording part 211, and determines whether or not there is any coinciding image. The vehicle abnormality monitoring part 705 monitors the vehicle abnormality detection part 215 installed in the vehicle and checks if there is any vehicle abnormality. When the vehicle abnormality monitoring part 705 detected a vehicle abnormality, it will transmit to the image storing part 706 an instruction for storing so as not cause difficulties even if the image information temporarily recorded in the image temporarily recording part 211 is overwrite-recorded by a newly shot image. In addition, the vehicle abnormality detection part 215 is equipped with sensors, such as an acceleration sensor and an impact sensor, capable of detecting a vehicle abnormality, and detects the encounter with an accident or a vehicle failure. The image retrieval part 704 includes control units, such as CPU, for example.

The image storing part 706 is a device that copies and stores an image information from the image temporarily recording part 211, the image information being temporarily recorded in the image temporarily recording part 211. The image storing part 706 includes recording devices, such as a hard disk and a memory, for example.

Figure 8:
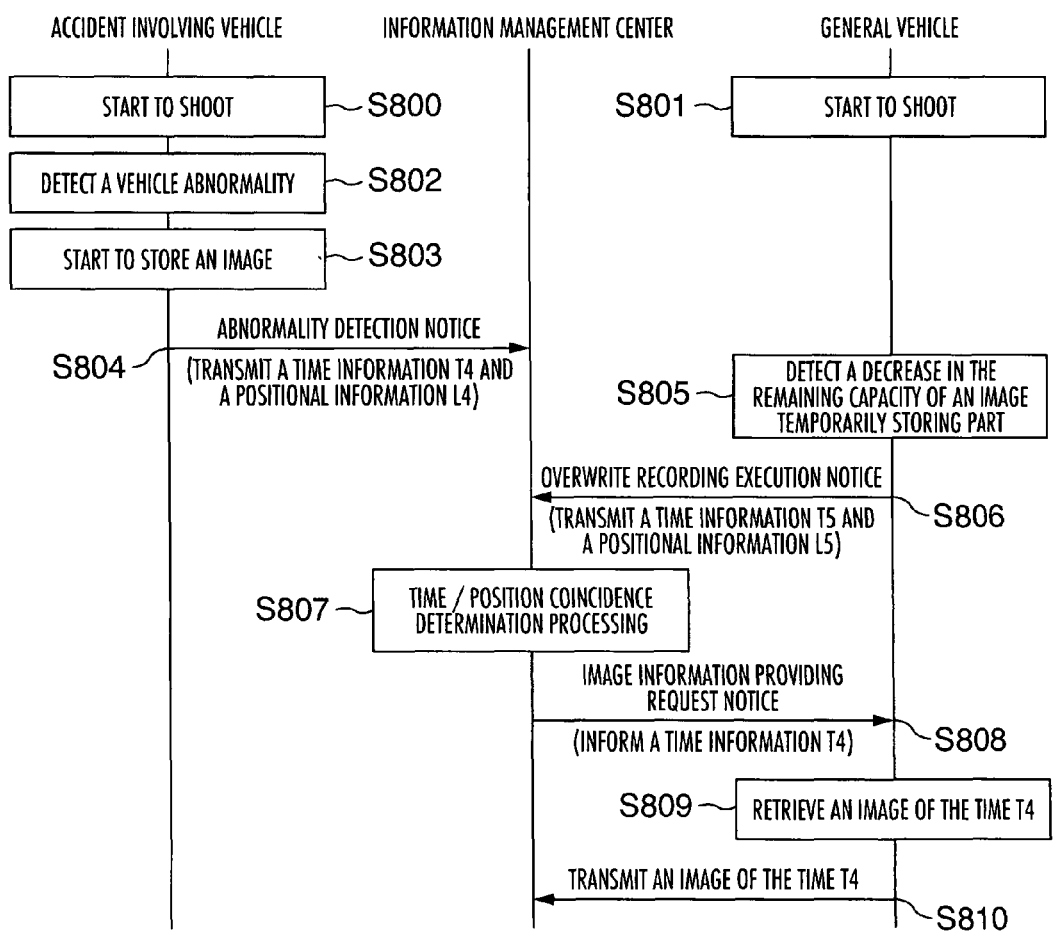
FIG. 8 is a view showing an operation example of a vehicle and the information management center at the time of an accident in the second embodiment.

FIG. 8 is a sequence diagram at the time of an accident showing the respective operations of the accident involving vehicle 100, the information management center 101 that is an organization for managing accidents, and the general vehicle 102 not having encountered the accident.

Hereinafter, with reference to FIG. 8, the respective communications of the accident involving vehicle 100, the information management center 101, and the general vehicle 102 are described. In addition, assume that the both accident involving vehicle 100 and general vehicle 102 are equipped with the vehicle information storage device of FIG. 7.

First, in S800 and S801, the accident involving vehicle 100 and the general vehicle 102 start to shoot the image around the vehicle using the shooting part 212, respectively. In S800 and S801, the timing to start to shoot may be when the engine of the vehicle is started or may be at any timing which the driver selects.

Subsequently, in the accident involving vehicle 100, if the vehicle abnormality detection part 215 detected a vehicle abnormality in S802, the image storing part 706 starts to store the image in S803. The method of detecting the abnormality is the same as the method in S402. The vehicle abnormality detection part 215 will not set a flag if the vehicle is in the normal condition and will set the flag if an abnormality is detected. The vehicle abnormality monitoring part 705 can detect whether the vehicle condition is normal or abnormal by managing the flag of the vehicle abnormality detection part 215.

As the technique of storing the image information in S803, the image information may be copied to the image storing part 706 from the image temporarily recording part 211, or a mechanism may be also employed in which the image storing part 706 manages the address for recording the shot images by distinguishing between the overwrite-recordable area and other area in the image temporarily recording part 211 with the use of the address information. Moreover, for the time to start storing the image, the recorded images from a time point T−t, which is t (sec) before the time T when the notice of the vehicle abnormality is received, may be recorded. The larger this t is the more detailed accident verification can be carried out because the situation before the accident can be verified later.

Then, in S804 the vehicle transmits an abnormality detection notice to the information management center 101 via the communication module 201. At this time, informations added to the abnormality detection notice are a time information T4 and an positional information L4. T4 is the information used for determining the time of the occurrence of the accident, and L4 for determining the location of the occurrence of the accident. The determination of the location of the accident site in S804 may be carried out by the information management center 101 without using the positional information L4 of the accident involving vehicle 100. In this case, the abnormality detection notice which the accident involving vehicle 100 transmits in S804 is only the time information T4.

Moreover, for the determination of the time of the occurrence of the accident in S804, the information management center 101 may carry out this without using the time information T4 of the vehicle. In this case, the information which the accident involving vehicle 100 transmits in S804 is only the abnormality detection notice.

Moreover, the information management center 101 may examine the truth of this abnormality detection notice.

On the other hand, after starting to shoot the image around the vehicle, the general vehicle 102 detects, during shooting, that the recordable area (remaining capacity) C of the image temporarily recording part 211 decreased less that an arbitrarily set threshold c (S805). Upon detection of a decrease in the remaining capacity, an overwrite-recording execution notice of whether or not the image data needs to be provided to the information management center 101 is transmitted to the information management center 101 via the communication module 201 in S806 before overwrite-recording the image data that is temporarily recorded in the image temporarily recording part 211. At this time, the informations used in the image data providing notice are a time information T5 indicative of the time when the image is recorded and a driving route information L5 indicative of the driving route on which the vehicle ran.

In S805, a trigger for transmitting the overwrite-recording execution notice may be an elapsed time T6 since the start of recording to the information storing device, other than the remaining capacity of the image temporarily recording part 211. The time information is periodically obtained from the time information management part 214, and a determination processing of whether or not a time period T6 that elapsed since the start of shooting exceeds an arbitrarily set threshold t2 is carried out. If it is determined that T6 exceeds t2 as a result of the determination processing, the overwrite-recording execution notice of the image data that is recorded in the image temporarily recording part 211 is transmitted to the information management center 101. If it is determined that T6 does not exceed t2, nothing is carried out and the image data is temporarily recorded to the image storing part 706. At this time, the information used in the overwrite-recording execution notice is the same information as the one described above. The trigger for transmitting the image data providing notice may be when a user completely erases the record contents of the vehicle information storage device at an arbitrary timing, other than the above-described remaining capacity determination or the elapsed time determination. This allows a user to completely erase the record contents at a desired timing and allows the usability of the vehicle information storage device to be improved. Moreover, the engine stopping may trigger to transmit the overwrite-recording execution notice. This allows the image recorded in the image temporarily recording part 211 to be periodically deleted, so that the image data stored in the information storage device 700 can be reduced. This allows to facilitate the image retrieval with respect to an image inquiry from the information management center 101 described later.

After receiving the overwrite-recording execution notice from the general vehicle 102, the information management center 101 carries out a time and position coincidence decision processing, which is a determination processing of whether or not the information which the general vehicle 102 informed in S806 has the information which the accident involving vehicle 100 informed in S804 recorded therein (S807). This determines whether the general vehicle 102 that issued the above-described image data providing notice to the information management center 101 existed around the accident involving vehicle 100, i.e., whether or not the general vehicle 102 has the image information near the accident site recorded therein.

In S807, if it is determined that they coincide, i.e., if it is determined that the time information T4 is contained in the time information T5 and the positional information L4 is contained in the driving route information L5, then an image information providing request notice to request for providing the image information is transmitted to the general vehicle 102. Moreover, along with the image information providing request notice, in S808 the information management center 101 informs the time information T4 received from the accident involving vehicle 100 and requests the general vehicle 102 to provide the image information of the time T4 point.

The general vehicle 102 that received the image information providing request notice retrieves the image shot at the time T4 in S809.

Subsequently, in S810, if the coinciding image data is found as a result of the retrieval, the image at the time T4 point is transmitted to the information management center 101. Here, for the timing of uploading the image in S810, various timing as described in S407 of FIG. 4 can be assumed and various advantages can be obtained depending on the upload timing.

On the other hand, although not described in the sequence of FIG. 8, if it is determined that they do not coincide in S807, i.e., if the time information T4 is not contained in the time information T5 or the positional information L4 is not contained in the driving route information L5, the information management center 101 transmits to the general vehicle 102 a non-request notice indicative of not requesting for providing the image information. The general vehicle 102 that received the non-request notice will not retrieve the image in S809 but temporarily record the image information like in the case where the remaining capacity of the image temporarily recording part 211 is not less than the threshold, and if there is no remaining capacity the general vehicle 102 will update the information recorded in the information storing device by overwrite-recording.

Moreover, in S805 the remaining capacity of the information storing device is monitored and when the remaining capacity decreased below an arbitrary threshold, all the image information already recorded may be unconditionally uploaded to the information management center 101 without transmitting the overwrite recording execution notice to the information management center 101. In this way, it is possible to avoid being overwrite-recorded by a newly shot image and at the same time the information management center 101 can collect the image shot by all the vehicles, thereby allowing for reliable and detailed accident inspection and accident cause investigation.

Moreover, in S810 a reward system may be introduced like in S407 or the concealment processing of personal information may be introduced.

In addition, also in FIG. 8, it is useful to obtain accurate time by the radio wave receiving/processing part 216 and take synchronization between the accident involving vehicle, the information management center 101, and the general vehicle 102.

Figure 9:
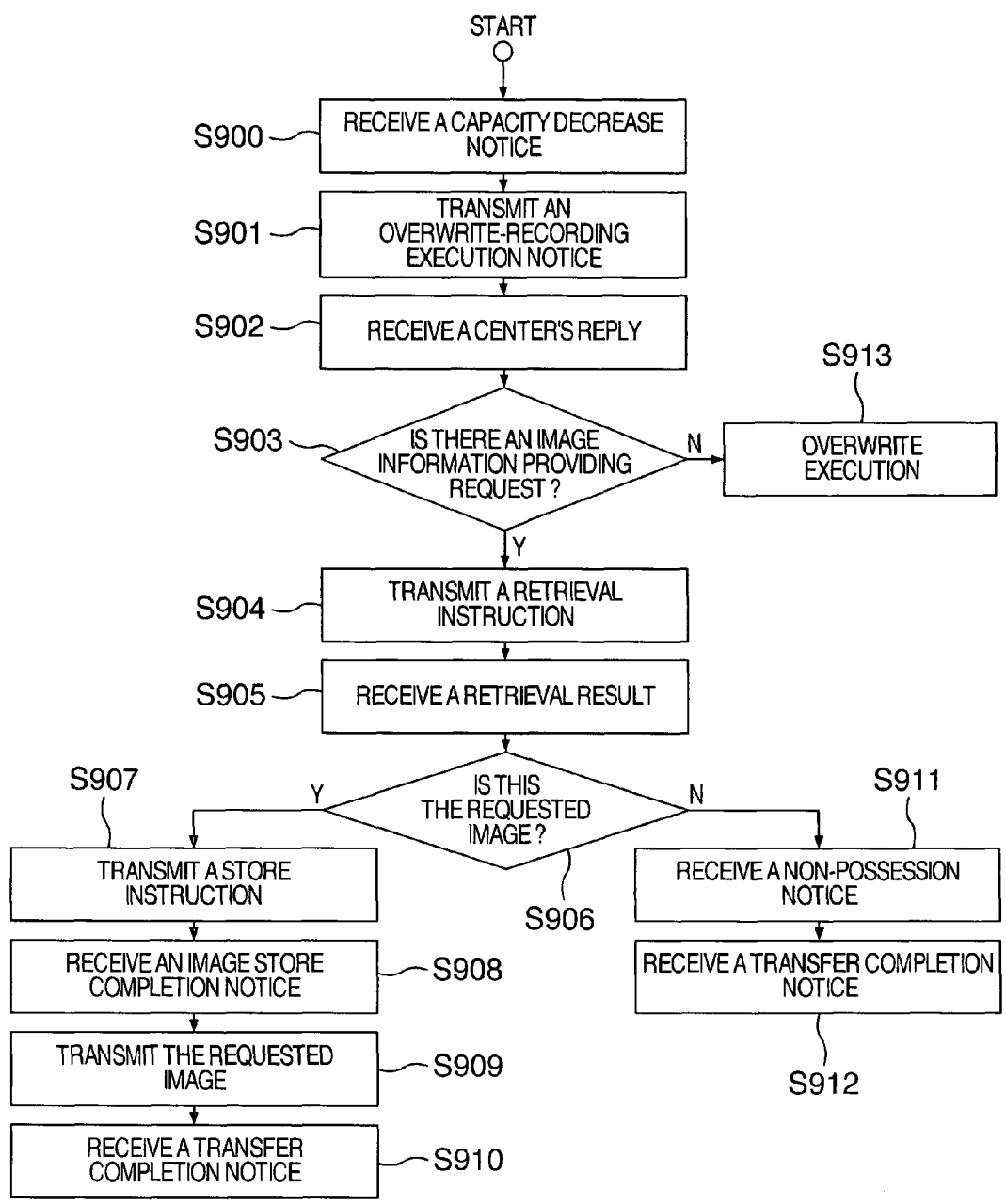
FIG. 9 is a view showing a process example of a recording capacity monitoring part in the second embodiment.

FIG. 9 shows an operation example of the recording capacity monitoring part 702 in FIG. 7, and is a flowchart showing the operation of the information storage device 700 at the time of temporarily recording the image information shot by the radio shooting part 212 installed in the vehicle.

First, in S900, the recording capacity monitoring part 702 receives a notice (capacity decrease notice) indicating that the capacity C that can be recorded by the image temporarily recording part 211 decreased below the arbitrary threshold c. As the timing for the image temporarily recording part 211 to transmit the above-described notice to the recording capacity monitoring part 702, the determination might be made based on the elapsed time after starting to record the image information to the image temporarily recording part 211, other than the remaining capacity of the image temporarily recording part 211. The determination process of whether or not the elapsed time T6 after starting to shoot exceeds the arbitrary thresholds t2 is carried out and if it exceeds, then a notice indicative of having exceeded the arbitrary threshold t2 is transmitted to the recording storage capacity monitoring part 702. Moreover, as an alternative technique of indicating that the capacity C that can be recorded to the image temporarily recording part 211 decreased below the arbitrary thresholds c, a technique of using a flag might be employed. The recording capacity monitoring part 702 monitors the remaining capacity of the image temporarily recording part 211 and will not set the flag until it decreases below the threshold c, and will set the flag when it decreased below the threshold c. The image storing/transferring control part 703 can recognize the state of the remaining capacity of the image temporarily recording part 211 by monitoring the flag managed by the recording capacity monitoring part 702. Moreover, also in case of determining the elapsed time after starting to record the image information, the same advantage can be obtaining by using the flag.

In order to transmit an overwrite execution notice when the remaining capacity of the storage device decreased below a predetermined value, the image will be transmitted and received between the information management center 101 when the general vehicle 102 has recorded images equal to or more than a certain capacity of images. Accordingly, the overwrite execution notice will not be issued between the information management center 101 while only a small amount of images is currently recorded in the recordable area of the image temporarily recording part 211, thus reducing the number of times of communicating with the information management center 101.

Subsequently, in S901, in order to transmit to the information management center 101 via the communication module 201 the overwrite recording execution notice for recognizing whether or not the image data needs to be provided to the information management center 101 before the image information temporarily recorded in the image temporarily recording part 211 is overwrite-recorded, the image storing/transferring control part 703 transfers the above-described overwrite recording execution notice to the communication control part 204.

Then, in S902, the image storing/transferring control part 703 receives via the communication control part 204 a reply (center's reply) from the information management center 101 with respect to the overwrite recording execution notice.

Then, in S903, the image storing/transferring control part 703 determines whether the image information providing request notice is contained in the center's reply.

In S903, if the center's reply is a reply (non-request notice) not requesting the general vehicle 102 for providing the image information, the flow changes to S913. In S913, like when the remaining capacity of the image temporarily recording part 211 is not less than the threshold in S904, the image information is overwrite-recorded to update the information that is recorded in the information storing device.

On the other hand, in S903, if the center's reply is the image information providing request notice that requests for providing the image information, then in S904 the image storing/transferring control part 703 transmits to the image retrieval part 704 a retrieval instruction of the image of the time T6 contained in the image information providing request notice. Then, the image storing/transferring control part 703 receives a retrieval result (search result) of the image retrieval instruction from the image retrieval part 704, in S905.

In S906, the image storing/transferring control part 703 determines from the image retrieval result whether or not there is any requested image (request image) from the information management center 101. If there is the requested image, the image storing/transferring control part 703 transmits to the image storing part 710 an instruction (store instruction) for storing the requested image, in S907. Here, the storing refers to copying to the image storing part 706 so as not cause difficulties even if the image information temporarily recorded in the image temporarily recording part 211 is overwrite-recorded.

Moreover, as the technique other than copying, a mechanism may be also employed in which the image storing part 706 manages the address for recording the shot images by distinguishing between the overwrite-recordable area and other area in the image temporarily recording part 211 with the use of the address information.

After completing to store the image to the image storing part 706, a notice (store completion notice) indicative of having completed storing is received from the image storing part 706, in S908. Then, in order to transmit the requested image to the information management center 101 via the communication module 201, the requested image stored by the image storing part 706 is transmitted from the communication control part 204, in S909. Moreover, if there is the requested image, the image may be directly transferred to the communication control part 204 from the image temporarily recording part 211 without storing the image to the image storing part 706 once. In this case, the processes in S907 and S908 will not be carried out. Upon completion of transferring images, the image transfer completion notice is received in S910. On the other hand, if it is determined that the requested image (request image) from the information management center 101 could not be found as a result of the retrieval in S906, the image storing/transferring control part 703 transmits to the communication control part 204 a non-possession notice indicative of not possessing the requested image. Then, when this non-possession notice could be transmitted via the antenna 202 successfully, the image storing/transferring control part 703 receives the transfer completion notice via the communication control part 204 in S912, thus terminating the sequence. If a requested image transfer failure notice or a transfer failure notice indicating the abnormal termination of uploading the image or of a non-possession notice is received in S910 or S912, a retry of transmission is carried out at the timing described in S407 of FIG. 4. Moreover, the upload timing might be changed in the first transmission and in the transmission retry, respectively. The upload timing is as described in S407 of FIG. 4.

Moreover, a series of communications described in the first embodiment and second embodiment may be carried out in the background, i.e., under the condition of not drawing user's attention. For example, for the driver of the general vehicle 102, if the receipt of an image request notice is informed in S404, it may interrupt the driving. The background processing can resolve this problem. Moreover, when receiving an image request notice through broadcasting in S404, actually plenty of general vehicles 102 that have not shot the image or the like of the position L1 at the time T1 may receive the image request notice. Accordingly, if the background processing is carried out in such case, the drive interruption for the drivers of the plenty of general vehicles 102 will be reduced.

Figure 10:
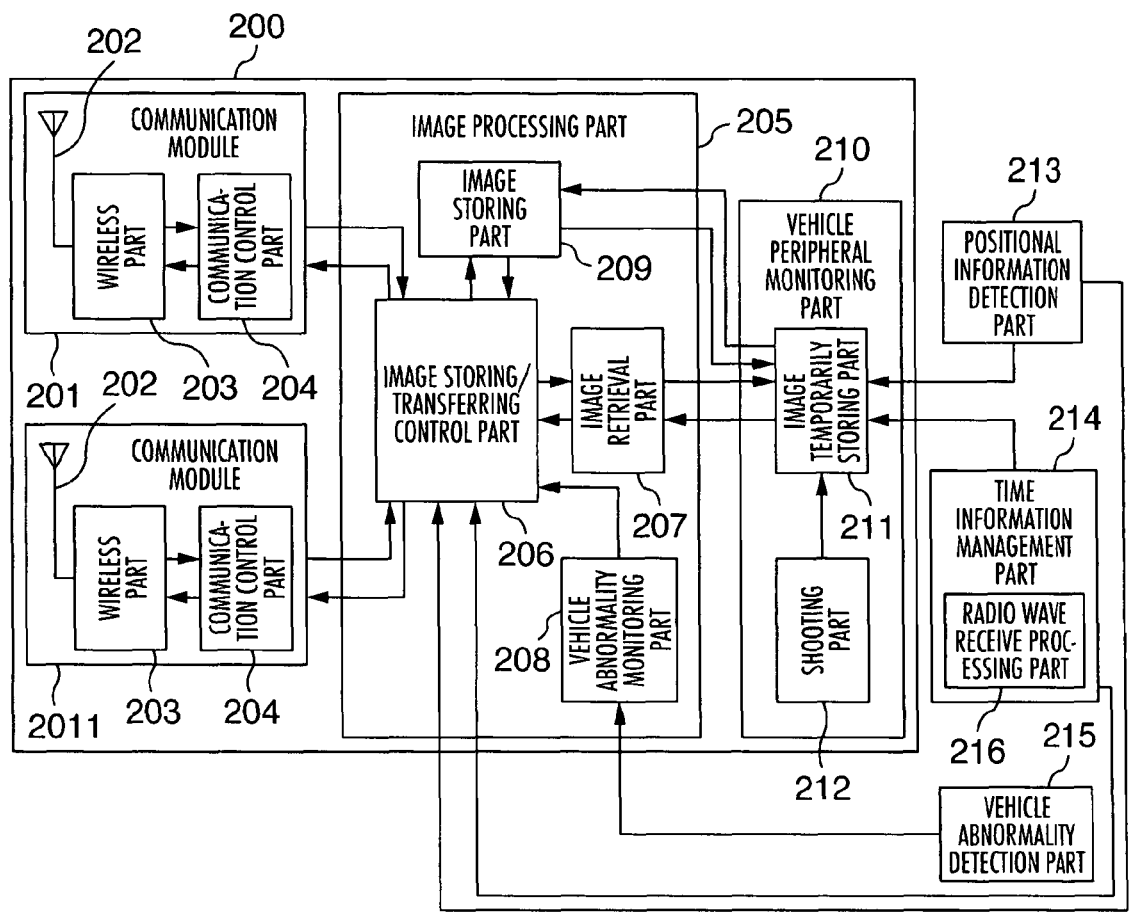
FIG. 10 is a view showing a configuration example of a vehicle information storage device with a communication module.

Then, in order to carry out this background processing, it is useful to mount two communication modules 201 in the information storing device 201 or in the information storing device 701. FIG. 10 shows a configuration example of this device. In FIG. 10, a communication module 2011 is provided in addition to the communication module 201, and the communication module 2011 has the same function as that of the communication module 201. Accordingly, also while the communication module 201 is transmitting image information, a user can place a call or the like using the other communication module 2011, thereby providing excellent usability to the user.

The foregoing invention has been described in terms of preferred embodiments. However, those skilled in the art will recognize that many variations of such embodiments exist. Such variations are intended to be within the scope of the present invention and the appended claims.

What is claimed is:

1. A communication system comprising a communication terminal configured to be mounted on a movable body and an information processing device, wherein:
   the information processing device includes a request transmission part which transmits to the communication terminal a request signal requesting transmission of an image, the request signal including positional information indicative of a position,
   the communication terminal includes an image obtaining part that obtains an image around the communication terminal, a position acquisition part that obtains a position at which the image is obtained, a recording part that associates the obtained image with the position at which the image is obtained and records the obtained image and the position, a receiving part that receives the request signal, and an image transmission part that transmits an image,
   the image transmission part transmits an image corresponding to a first received request signal to the information processing device, when the recording part has the image corresponding to a position indicated by positional information in the first received request signal and the movable body is involved in a traffic jam, and
   the image transmission part does not transmit an image corresponding to a second received request signal to the information processing device, when the recording part has the image corresponding to a position indicated by positional information in the second received request signal but the movable body is not involved in a traffic jam,
   the request signal includes information indicative of whether or not a request is urgent, and
   the image transmission part does not transmit an image corresponding to a third received request signal to the information processing device, when the recording part has the image corresponding to a position indicated by positional information in the third received request signal, but the third received request signal does not include the information indicative that the third received request signal is urgent and the movable body is not involved in a traffic jam, and
   the image transmission part transmits an image corresponding to a fourth received request signal to the information processing device, when the recording part has the image corresponding to a position indicated by positional information in the fourth received request signal and the fourth received request signal includes the information indicative that the fourth received request signal is urgent, irrespective of whether the movable body is involved in a traffic jam or not.

2. The communication system according to claim 1, wherein whether or not the movable body is involved in a traffic jam is determined based on a traffic information.

3. A communication system comprising a communication terminal configured to be mounted on a movable body and an information processing device, wherein:

the information processing device includes a request transmission part which transmits to the communication terminal a request signal requesting transmission of an image, the request signal including positional information indicative of a position, the communication terminal includes an image obtaining part that obtains an image around the communication terminal, a position acquisition part that obtains a position at which the image is obtained, a recording part that associates the obtained image with the position at which the image is obtained and records the obtained image and the position, a receiving part that receives the request signal, and an image transmission part that transmits an image, the image transmission part transmits an image corresponding to a first received request signal to the information processing device, when the recording part has the image corresponding to a position indicated by positional information in the first received request signal and the movable body is involved in a traffic jam, and the image transmission part does not transmit an image corresponding to a second received request signal to the information processing device, when the recording part has the image corresponding to a position indicated by positional information in the second received request signal but the movable body is not involved in a traffic jam, the communication terminal includes a time acquisition part that obtains a time at which the image is obtained, the request signal includes time information indicative of a time, the recording part further associates the obtained image with the time obtained by the time acquisition part and records the time, the image transmission part transmits an image corresponding to a third received request signal to the information processing device, when the recording part has the image obtained at a position indicated by positional information and a time indicated by time information in the third received request signal, and the movable body is involved in a traffic jam, and the image transmission part does not transmit an image corresponding to a fourth received request signal to the information processing device, when the recording part has the image obtained at a position indicated by positional information and a time indicated by time information in the fourth received request signal but the movable body is not involved in a traffic jam.

4. A communication system comprising a communication terminal configured to be mounted on a movable body and an information processing device, wherein:

the information processing device includes a request transmission part which transmits to the communication terminal a request signal requesting transmission of an image, the request signal including positional information indicative of a position and information indicative of whether or not a request is urgent, the communication terminal includes an image obtaining part that obtains an image around the communication terminal, a position acquisition part that obtains a position at which the image is obtained, a recording part that associates the obtained image with the position at which the image is obtained and records the obtained image and the position, a receiving part that receives the request signal, and an image transmission part that transmits an image, the image transmission part transmits an image corresponding to a first received request signal to the information processing device, when the recording part has the image corresponding to a position indicated by positional information in the first received request signal and a moving velocity of the movable body is less than a predetermined value, the image transmission part does not transmit an image corresponding to a second received request signal to the information processing device, when the recording part has the image corresponding to a position indicated by positional information in the second received request signal, but the request signal does not include information indicative that the second received request signal is urgent and the moving velocity of the movable body is equal to or higher than the predetermined value, the image transmission part transmits an image corresponding to a third received request signal to the information processing device, when the recording part has the image corresponding to a position indicated by positional information in the third received request signal and the third received request signal includes information indicative that the third received request signal is urgent, irrespective of whether the moving velocity of the movable body is equal to or higher than the predetermined value, the communication terminal includes a time acquisition part that obtains a time at which the image is obtained, the request signal includes time information indicative of a time, the recording part further associates the obtained image with the time obtained by the time acquisition part and records the time, the image transmission part transmits an image corresponding to a fourth received request signal to the information processing device, when the recording part has the image obtained at a position indicated by positional information and a time indicated by time information in the fourth received request signal, and a moving velocity of the movable body is less than a predetermined value, the image transmission part does not transmit an image corresponding to a fifth received request signal to the information processing device, when the recording part has the image obtained at a position indicated by positional information and a time indicated by time information in the fifth received request signal, but the request signal does not include information indicative that the fifth received request signal is urgent, and the moving velocity of the movable body is equal to or higher than the predetermined value, and the image transmission part transmits an image corresponding to a sixth received request signal to the information processing device, when the recording part has the image obtained at a position indicated by positional information and a time indicated by time information in the sixth received request signal, and the sixth received request signal includes information indicative that the sixth received request signal is urgent, irrespective of whether the moving velocity of the movable body is equal to or higher than the predetermined value.

5. A communication system comprising a communication terminal configured to be mounted on a movable body and an information processing device, wherein:

the information processing device includes a request transmission part which transmits to the communication terminal a request signal requesting transmission of an image, the request signal including positional information indicative of a position, the communication terminal includes an image obtaining part that obtains an image around the communication terminal, a position acquisition part that obtains a position at which the image is obtained, a recording part that associates the obtained image with the position at which the image is obtained and records the obtained image and the position, a receiving part that receives the request signal, and an image transmission part that transmits an image, the image transmission part transmits an image corresponding to a first received request signal to the information processing device, when the recording part has the image corresponding to a position indicated by positional information in the first received request signal and a field intensity information indicative of a field intensity is higher than a predetermined value, the image transmission part does not transmit an image corresponding to a second received request signal to the information processing device, when the recording part has the image corresponding to a position indicated by positional information in the second received request signal but the field intensity information is equal to or lower than the predetermined value, the request signal includes information indicative of whether or not a request is urgent, the image transmission part does not transmit an image corresponding to a third received request signal to the information processing device, when the recording part has the image corresponding to a position indicated by positional information in the third received request signal, but the third received request signal does not include information indicative that the third received request signal is urgent and the field intensity information is equal to or lower than the predetermined value, and the image transmission part transmits an image corresponding to a fourth received request signal to the information processing device, when the recording part has the image corresponding to a position indicated by positional information in the fourth received request signal and the fourth received request signal includes information indicative that the fourth received request signal is urgent, irrespective of whether the field intensity information is equal to or lower than the predetermined value.

6. A communication system comprising a communication terminal configured to be mounted on a movable body and an information processing device, wherein:

the information processing device includes a request transmission part which transmits to the communication terminal a request signal requesting transmission of an image, the request signal including positional information indicative of a position, the communication terminal includes an image obtaining part that obtains an image around the communication terminal, a position acquisition part that obtains a position at which the image is obtained, a recording part that associates the obtained image with the position at which the image is obtained and records the obtained image and the position, a receiving part that receives the request signal, and an image transmission part that transmits an image, the image transmission part transmits an image corresponding to a first received request signal to the information processing device, when the recording part has the image corresponding to a position indicated by positional information in the first received request signal and a field intensity information indicative of a field intensity is higher than a predetermined value, the image transmission part does not transmit an image corresponding to a second received request signal to the information processing device, when the recording part has the image corresponding to a position indicated by positional information in the second received request signal but the field intensity information is equal to or lower than the predetermined value, the communication terminal includes a time acquisition part that obtains a time at which the image is obtained, the request signal includes time information indicative of a time, the recording part further associates the obtained image with the time obtained by the time acquisition part and records the time, the image transmission part transmits an image corresponding to a third received request signal to the information processing device, when the recording part has the image obtained at a position indicated by positional information and a time indicated by time information in the third received request signal and a field intensity information indicative of a field intensity is higher than a predetermined value, and the image transmission part does not transmit an image corresponding to a fourth received request signal to the information processing device, when the recording part has the image obtained at a position indicated by positional information and a time indicated by time information in the fourth received request signal but the field intensity information is equal to or lower than the predetermined value.

7. A communication terminal configured to be mounted on a movable body, the communication terminal comprising:

a obtaining part that obtains an image;

a position acquisition part that obtains a position at which the image is obtained;

a recording part that associates the obtained image with the position, and records the obtained image and the position;

a receiving part that receives a request signal requesting transmission of an image corresponding to positional information, the request signal including the positional information indicative of a position;

an image transmission part that transmits an image, wherein:

the image transmission part transmits an image corresponding to a first received request signal to the information processing device, when the recording part has the image corresponding to a position indicated by positional information in the first received request signal and the movable body is involved in a traffic jam, the image transmission part does not transmit an image corresponding to a second received request signal to the information processing device, when the recording part has the image corresponding to a position indicated by positional information in the second received request signal but the movable body is not involved in a traffic jam, the request signal includes information indicative of whether or not a request is urgent, the image transmission part does not transmit an image corresponding to a third received request signal to the information processing device, when the recording part has the image corresponding to a position indicated by positional information in the third received request signal, but the third received request signal does not include information indicative that the third received request signal is urgent and the movable body is not involved in a traffic jam, and the image transmission part transmits an image corresponding to a fourth received request signal to the information processing device, when the recording part has the image obtained at a position indicated by positional information in the fourth received request signal and the fourth received request signal includes information indicative that the fourth received request signal is urgent, irrespective of whether the movable body is not involved in a traffic jam.

8. The communication terminal according to claim 7, wherein whether or not the movable body is involved in a traffic jam is determined based on a traffic information.

9. A communication terminal configured to be mounted on a movable body, the communication terminal comprising:
- a obtaining part that obtains an image;
- a position acquisition part that obtains a position at which the image is obtained;
- a recording part that associates the obtained image with the position, and records the obtained image and the position;
- a receiving part that receives a request signal requesting transmission of an image corresponding to positional information, the request signal including the positional information indicative of a position;
- an image transmission part that transmits an image, wherein:
- the image transmission part transmits an image corresponding to a first received request signal to the information processing device, when the recording part has the image corresponding to a position indicated by positional information in the first received request signal and the movable body is involved in a traffic jam,
- the image transmission part does not transmit an image corresponding to a second received request signal to the information processing device, when the recording part has the image corresponding to a position indicated by positional information in the second received request signal but the movable body is not involved in a traffic jam,
- the communication terminal includes a time acquisition part that obtains a time at which the image is obtained,
- the request signal includes time information indicative of a time,
- the recording part further associates the obtained image with the time obtained by the time acquisition part, and records the time,
- the image transmission part transmits an image corresponding to a third received request signal to the information processing device, when the recording part has the image obtained at a position indicated by positional information and a time indicated by time information in the third received request signal and the movable body is involved in a traffic jam, and
- the image transmission part does not transmit an image corresponding to a fourth received request signal to the information processing device, when the recording part has the image obtained at a position indicated by positional information and a time indicated by time information in the fourth received request signal but the movable body is not involved in a traffic jam.

10. A communication terminal configured to be mounted on a movable body, comprising:
- a obtaining part that obtains an image;
- a position acquisition part that obtains a position at which the image is obtained;
- a recording part that associates the obtained image with the position, and records the obtained image and the position;
- a receiving part that receives a request signal requesting transmission of an image corresponding to positional information, the request signal including the positional information indicative of a position; and
- an image transmission part that transmits an image, wherein:
- the request signal includes information indicative of whether or not a request is urgent,
- the image transmission part transmits an image corresponding to a first received request signal to the information processing device, when the recording part has the image corresponding to a position indicated by positional information included in the first received request signal and a moving velocity of the movable body is less than a predetermined value,
- the image transmission part does not transmit an image corresponding to a second received request signal to the information processing device, when the recording part has the image corresponding to a position indicated by positional information included in the second received request signal, but the second received request signal does not include information indicative that the second received request signal is urgent and the moving velocity of the movable body is equal to or higher than the predetermined value,
- the image transmission part transmits an image corresponding to a third received request signal to the information processing device, when the recording part has the image corresponding to a position indicated by positional information included in the third received request signal and the third received request signal includes information indicative that the third received request signal is urgent, irrespective of whether the moving velocity of the movable body is equal to or higher than the predetermined value,
- the communication terminal includes a time acquisition part that obtains a time at which the image is obtained,
- the request signal includes time information indicative of a time,
- the recording part further associates the obtained image with the time obtained by the time acquisition part, and records the obtained image and the time,
- the image transmission part transmits an image corresponding to a fourth received request signal to the information processing device, when the recording part has the image obtained at a position indicated by positional information and a time indicated by time information in the fourth received request signal and a moving velocity of the movable body is less than a predetermined value,
- the image transmission part does not transmit an image corresponding to a fifth received request signal to the information processing device, when the recording part has the image obtained at a position indicated by positional information and a time indicated by time information included in the fifth received request signal, but the fifth received request signal does not include information indicative that the fifth received request signal is urgent and the moving velocity of the movable body is equal to or higher than the predetermined value, and the image transmission part transmits an image corresponding to a sixth received request signal to the information processing device, when the recording part has the image obtained at a position indicated by positional information and a time indicated by time information included in the sixth received request signal and the sixth received request signal includes information indicative that the sixth received request signal is urgent, irrespective of whether the moving velocity of the movable body is equal to or higher than the predetermined value.

11. A communication terminal configured to be mounted on a movable body, comprising:
 a obtaining part that obtains an image;
 a position acquisition part that obtains a position at which the image is obtained;
 a recording part that associates the obtained image with the position, and records the obtained image and the position;
 a receiving part that receives a request signal requesting transmission of an image corresponding to positional information, the request signal including the positional information indicative of a position; and
 an image transmission part that transmits an image, wherein:
 the image transmission part transmits an image corresponding to a first received request signal to the information processing device, when the recording part has the image corresponding to a position indicated by positional information in the first received request signal and a field intensity information indicative of a field intensity is higher than a predetermined value, and
 the image transmission part does not transmit an image corresponding to a second received request signal to the information processing device, when the recording part has the image corresponding to a position indicated by positional information in the second received request signal but the field intensity information is equal to or lower than the predetermined value,
 the request signal includes information indicative of whether or not a request is urgent,
 the image transmission part does not transmit an image corresponding to a third received request signal to the information processing device, when the recording part has the image corresponding to a position indicated by positional information in the third received request signal, but the third received request signal does not include information indicative that the third received request signal is urgent and the field intensity information is equal to or lower than the predetermined value, and
 the image transmission part transmits an image corresponding to a fourth received request signal to the information processing device, when the recording part has the image corresponding to a position indicated by positional information in the fourth received request signal and the fourth received request signal includes information indicative that the fourth received request signal is urgent, irrespective of whether the field intensity information is equal to or lower than the predetermined value.

12. A communication terminal configured to be mounted on a movable body, comprising:
 a obtaining part that obtains an image;
 a position acquisition part that obtains a position at which the image is obtained;
 a recording part that associates the obtained image with the position, and records the obtained image and the position;
 a receiving part that receives a request signal requesting transmission of an image corresponding to positional information, the request signal including the positional information indicative of a position; and
 an image transmission part that transmits an image, wherein:
 the image transmission part transmits an image corresponding to a first received request signal to the information processing device, when the recording part has the image corresponding to a position indicated by positional information in the first received request signal and a field intensity information indicative of a field intensity is higher than a predetermined value, and
 the image transmission part does not transmit an image corresponding to a second received request signal to the information processing device, when the recording part has the image corresponding to a position indicated by positional information in the second received request signal but the field intensity information is equal to or lower than the predetermined value,
 the communication terminal includes a time acquisition part that obtains a time at which the image is obtained,
 the request signal includes time information indicative of a time,
 the recording part further associates the obtained image with the time obtained by the time acquisition part, and records the obtained image and the time,
 the image transmission part transmits an image corresponding to a third received request signal to the information processing device, when the recording part has the image obtained at a position indicated by positional information and a time indicated by time information in the third received request signal and a field intensity information indicative of a field intensity is higher than a predetermined value, and
 the image transmission part does not transmit an image corresponding to a fourth received request signal to the information processing device, when the recording part has the image obtained at a position indicated by positional information and a time indicated by time information in the fourth received request signal but the field intensity information is equal to or lower than the predetermined value.

13. A communication system comprising a communication terminal configured to be mounted on a movable body and an information processing device, wherein:
 the information processing device includes a request transmission part which transmits to the communication terminal a request signal requesting transmission of information,
 the communication terminal includes an acquisition part that obtains information, a recording part that records the obtained information, a receiving part that receives the request signal, and an information transmission part that transmits information to the information processing terminal,
 the information transmission part transmits information corresponding to a first received request signal to the information processing, when the recording part has the information corresponding to the first received request signal and the movable body is involved in a traffic jam,
 the information transmission part does not transmit information corresponding to a second received request signal to the information processing device, when the recording part has the information corresponding to the second received request signal but the movable body is not involved in a traffic jam, the request signal includes information indicative of whether or not a request is urgent, the information transmission part does not transmit information corresponding to a third received request signal to the information processing device, when the recording part has the information corresponding to the third received request signal, but the third request signal does not include information indicative that the third received request signal is urgent and the movable body is not involved in a traffic jam, and the information transmission part transmits information corresponding to a fourth received request signal to the information processing device, when the recording part has the information corresponding to the fourth received request signal and the fourth received request signal includes information indicative that the fourth received request signal is urgent, irrespective of whether the movable body is not involved in a traffic jam.

14. The communication system according to claim 13, wherein whether or not the movable body is involved in a traffic jam is determined based on a traffic information.

15. A communication system comprising a communication terminal configured to be mounted on a movable body and an information processing device, wherein:

the information processing device includes a request transmission part which transmits to the communication terminal a request signal requesting transmission of information, the communication terminal includes an acquisition part that obtains information, a recording part that records the obtained information, a receiving part that receives the request signal, and an information transmission part that transmits information to the information processing terminal, the information transmission part transmits information corresponding to a first received request signal to the information processing, when the recording part has the information corresponding to the first received request signal and the movable body is involved in a traffic jam, the information transmission part does not transmit information corresponding to a second received request signal to the information processing device, when the recording part has the information corresponding to the second received request signal but the movable body is not involved in a traffic jam, the communication terminal includes a time acquisition part that obtains a time at which the information is obtained, the request signal includes time information indicative of a time, the recording part associates the obtained information with the time obtained by the time acquisition part, and records the obtained information and the time, the information transmission part transmits information corresponding to a third received request signal to the information processing, when the recording part has the information corresponding to a time indicated by time information in the third received request signal and the movable body is involved in a traffic jam, and the information transmission part does not transmit information corresponding to a fourth received request signal to the information processing device, when the recording part has the information corresponding to a time indicated by time information in the fourth received request signal but the movable body is not involved in a traffic jam.

16. A communication system comprising a communication terminal configured to be mounted on a movable body and an information processing device, wherein:

the information processing device includes a request transmission part which transmits to the communication terminal a request signal requesting transmission of information, the request signal including information indicative of whether or not a request is urgent, the communication terminal includes an acquisition part that obtains information, a recording part that records the obtained information, a receiving part that receives the request signal, and an information transmission part that transmits the information to the information processing device, the information transmission part transmits information corresponding to a first received request signal to the information processing device, when the recording part has the information corresponding to the first received request signal and a moving velocity of the movable body is less than a predetermined value, the information transmission part does not transmit information corresponding to a second received request signal to the information processing device, when the recording part has the information corresponding to the second received request signal, but the second received request signal does not include information indicative that the second received request signal is urgent and the moving velocity of the movable body is equal to or higher than the predetermined value, the information transmission part transmits information corresponding to a third received request signal to the information processing device, when the recording part has the information corresponding to the third received request signal and the third received request signal includes information indicative that the third received request signal is urgent, irrespective of whether the moving velocity of the movable body is equal to or higher than the predetermined value, the communication terminal includes a time acquisition part that obtains a time at which the information is obtained, the request signal includes time information indicative of a time, the recording part associates the obtained information with the time obtained by the time acquisition part, and records the obtained information and the time, the information transmission part transmits information corresponding to a fourth received request signal to the information processing device, when the recording part has the information corresponding to a time indicated by time information in the fourth received request signal and a moving velocity of the movable body is less than a predetermined value, the information transmission part does not transmit information corresponding to a fifth received request signal to the information processing device, when the recording part has the information corresponding to a time indicated by time information in the fifth received request signal, but the fifth received request signal does not include information indicative that the fifth received request signal is urgent and the moving velocity of the movable body is equal to or higher than the predetermined value, and the information transmission part transmits information corresponding to a sixth received request signal to the information processing device, when the recording part has the information corresponding to a time indicated by time information in the sixth received request signal and the sixth received request signal includes information indicative that the sixth received request signal is urgent, irrespective of whether the moving velocity of the movable body is equal to or higher than the predetermined value.

17. A communication system comprising a communication terminal configured to be mounted on a movable body and an information processing device, wherein:
the information processing device includes a request transmission part which transmits to the communication terminal a request signal requesting transmission of information,
the communication terminal includes an acquisition part that obtains information, a recording part that records the obtained information, a receiving part that receives the request signal, and an information transmission part that transmits information to the information processing device,
the information transmission part transmits information corresponding to a first received request signal to the information processing device, when the recording part has the information corresponding to the first received request signal and a field intensity information indicative of a field intensity is higher than a predetermined value,
the information transmission part does not transmit information corresponding to a second received request signal to the information processing device, when the recording part has the information corresponding to the second received request signal and the field intensity information is equal to or lower than the predetermined value,
the request signal includes information indicative of whether or not a request is urgent,
the information transmission part does not transmit information corresponding to a third received request signal to the information processing device, when the recording part has the information corresponding to the third received request signal, but the third received request signal does not include information indicative that the third received request signal is urgent and the field intensity information is equal to or lower than the predetermined value, and
the information transmission part transmits information corresponding to a fourth received request signal to the information processing device, when the recording part has the information corresponding to the fourth received request signal and the fourth received request signal includes information indicative that the fourth received request signal is urgent, irrespective of whether the field intensity information is equal to or lower than the predetermined value.

18. A communication system comprising a communication terminal configured to be mounted on a movable body and an information processing device, wherein:
the information processing device includes a request transmission part which transmits to the communication terminal a request signal requesting transmission of information,
the communication terminal includes an acquisition part that obtains information, a recording part that records the obtained information, a receiving part that receives the request signal, and an information transmission part that transmits information to the information processing device,
the information transmission part transmits information corresponding to a first received request signal to the information processing device, when the recording part has the information corresponding to the first received request signal and a field intensity information indicative of a field intensity is higher than a predetermined value,
the information transmission part does not transmit information corresponding to a second received request signal to the information processing device, when the recording part has the information corresponding to the second received request signal and the field intensity information is equal to or lower than the predetermined value,
the communication terminal includes a time acquisition part that obtains a time at which the information is obtained,
the request signal includes time information indicative of a time,
the recording part associates the obtained information with the time obtained by the time acquisition part, and records the obtained information and the time,
the information transmission part transmits information corresponding to a third received request signal to the information processing device, when the recording part has the information corresponding to a time indicated by time information in the third received request signal and a field intensity information indicative of a field intensity is higher than a predetermined value, and
the information transmission part does not transmit information corresponding to a fourth received request signal to the information processing device, when the recording part has the information corresponding to a time indicated by time information in the fourth received request signal and the field intensity information is equal to or lower than the predetermined value.

19. A communication terminal configured to be mounted on a movable body, comprising:
an acquisition part that obtains information;
a recording part that records the obtained information;
a receiving part that receives a request signal requesting transmission of information; and
an information transmission part that transmits information, wherein:
the information transmission part transmits information corresponding to a first received request signal to the information processing device, when the recording part has the information corresponding to the first received request signal and the movable body is involved in a traffic jam, and
the information transmission part does not transmit information corresponding to a second received request signal to the information processing device, when the recording part has the information corresponding to the second received request signal but the movable body is not involved in a traffic jam,
the request signal includes information indicative whether or not a request is urgent,
the information transmission part does not transmit information corresponding to a third received request signal to the information processing device, when the recording part has the information corresponding to the third received request signal, but the third received request signal does not include information indicative that the third received request signal is urgent and the movable body is not involved in a traffic jam, and the information transmission part transmits information corresponding to a fourth received request signal to the information processing device, when the recording part has the information corresponding to the fourth received request signal and the fourth received request signal includes information indicative that the fourth received request signal is urgent, irrespective of whether the movable body is not involved in a traffic jam.

20. The communication terminal according to claim 19, wherein whether or not the movable body is involved in a traffic jam is determined based on a traffic information.

21. A communication terminal configured to be mounted on a movable body, comprising:
an acquisition part that obtains information;
a recording part that records the obtained information;
a receiving part that receives a request signal requesting transmission of information; and
an information transmission part that transmits information, wherein:
the information transmission part transmits information corresponding to a first received request signal to the information processing device, when the recording part has the information corresponding to the first received request signal and the movable body is involved in a traffic jam, and
the information transmission part does not transmit information corresponding to a second received request signal to the information processing device, when the recording part has the information corresponding to the second received request signal but the movable body is not involved in a traffic jam,
the communication terminal includes a time acquisition part that obtains a time at which the information is obtained,
the request signal includes time information indicative of a time,
the recording part associates the obtained information with the time obtained by the time acquisition part, and records the obtained information and the time,
the information transmission part transmits information corresponding to a third received request signal to the information processing device, when the recording part has the information corresponding to a time indicated by time information in the third received request signal and the movable body is involved in a traffic jam, and
the information transmission part does not transmit information corresponding to a fourth received request signal to the information processing device, when the recording part has the information corresponding to a time indicated by time information in the fourth received request signal but the movable body is not involved in a traffic jam.

22. A communication terminal configured to be mounted on a movable body, comprising:
an acquisition part that obtains information;
a recording part that records the obtained information;
a receiving part that receives a request signal requesting transmission of information; and
an information transmission part that transmits information, wherein:
the request signal includes information indicative of whether or not a request is urgent,
the information transmission part transmits information corresponding to a first received request signal to the information processing device, when the recording part has the information corresponding to the first received request signal and a moving velocity of the movable body is less than a predetermined value,
the information transmission part does not transmit information corresponding to a second received request signal to the information processing device, when the recording part has the information corresponding to the second received request signal, but the second received request signal does not include information indicative that the second received request signal is urgent and the moving velocity of the movable body is equal to or higher than the predetermined value,
the information transmission part transmits information corresponding to a third received request signal to the information processing device, when the recording part has the information corresponding to the third received request signal and the third received request signal includes information indicative that the third received request signal is urgent, irrespective of whether the moving velocity of the movable body is equal to or higher than the predetermined value,
the communication terminal includes a time acquisition part that obtains a time at which the information is obtained,
the request signal includes time information indicative of a time,
the recording part associates the obtained information with the time obtained by the time acquisition part, and records the obtained information and the time,
the information transmission part transmits information corresponding to a fourth received request signal to the information processing device, when the recording part has the information corresponding to a time indicated by time information in the fourth received request signal and a moving velocity of the movable body is less than a predetermined value,
the information transmission part does not transmit information corresponding to a fifth received request signal to the information processing device, when the recording part has the information corresponding to a time indicated by time information in the fifth received request signal, but the fifth received request signal does not include information indicative that the fifth received request is urgent and the moving velocity of the movable body is equal to or higher than the predetermined value, and
the information transmission part transmits information corresponding to a sixth received request signal to the information processing device, when the recording part has the information corresponding to a time indicated by time information in the sixth received request signal and the sixth received request signal includes information indicative that the sixth received request signal is urgent, irrespective of whether the moving velocity of the movable body is equal to or higher than the predetermined value.

23. A communication terminal configured to be mounted on a movable body, comprising:
an acquisition part that obtains information;
a recording part that records the obtained information;
a receiving part that receives a request signal requesting transmission of information; and
an information transmission part that transmits information, wherein:
the information transmission part transmits information corresponding to a first received request signal to the information processing device, when the recording part has the information corresponding to the first received request signal and a field intensity information indicative of a field intensity is higher than a predetermined value, the information transmission part does not transmit information corresponding to a second received request signal to the information processing device, when the recording part has the information corresponding to the second received request signal but the field intensity information is equal to or lower than the predetermined value, the request signal includes information indicative of whether or not a request is urgent, the information transmission part does not transmit information corresponding to a third received request signal to the information processing device, when the recording part has the information corresponding to the third received request signal, but the third received request signal does not include information indicative that the third received request signal is urgent and the field intensity information is equal to or lower than the predetermined value, and the information transmission part transmits information corresponding to a fourth received request signal to the information processing device, when the recording part has the information corresponding to the fourth received request signal and the fourth received request signal includes information indicative that the fourth received request signal is urgent, irrespective of whether the field intensity information is equal to or lower than the predetermined value.

24. A communication terminal configured to be mounted on a movable body, comprising:

an acquisition part that obtains information;

a recording part that records the obtained information;

a receiving part that receives a request signal requesting transmission of information; and an information transmission part that transmits information, wherein:

the information transmission part transmits information corresponding to a first received request signal to the information processing device, when the recording part has the information corresponding to the first received request signal and a field intensity information indicative of a field intensity is higher than a predetermined value, the information transmission part does not transmit information corresponding to a second received request signal to the information processing device, when the recording part has the information corresponding to the second received request signal but the field intensity information is equal to or lower than the predetermined value, the communication terminal includes a time acquisition part that obtains a time at which the information is obtained, the request signal includes time information indicative of a time, the recording part associates the obtained information with the time obtained by the time acquisition part, and records the obtained information and the time, the information transmission part transmits information corresponding to a third received request signal to the information processing device, when the recording part has the information corresponding to a time indicated by time information in the third received request signal and a field intensity information indicative of a field intensity is higher than a predetermined value, and the information transmission part does not transmit information corresponding to a third received request signal to the information processing device, when the recording part has the information corresponding to a time indicated by time information in the third received request signal but the field intensity information is equal to or lower than the predetermined value.

\* \* \* \* \*